(12) United States Patent
Kobayashi et al.

(10) Patent No.: US 7,660,319 B2
(45) Date of Patent: Feb. 9, 2010

(54) MOBILE TERMINAL DEVICE, TOPOLOGY MANAGEMENT DEVICE, LOCATION MANAGEMENT DEVICE, AND COMMUNICATION METHOD

(75) Inventors: Motonari Kobayashi, Yokohama (JP); Toshihiro Suzuki, Yokohama (JP); Ashiq Khan, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 487 days.

(21) Appl. No.: 11/512,245

(22) Filed: Aug. 30, 2006

(65) Prior Publication Data

US 2007/0091838 A1   Apr. 26, 2007

(30) Foreign Application Priority Data

Aug. 31, 2005   (JP) .......................... P2005-252082

(51) Int. Cl.
*H04L 12/28* (2006.01)
(52) U.S. Cl. .................. 370/406; 370/255; 455/457
(58) Field of Classification Search ................ 370/255, 370/406; 455/457
See application file for complete search history.

(56) References Cited

U.S. PATENT DOCUMENTS 6,744,740 B2 *   6/2004   Chen .................... 370/255
2003/0117966 A1   6/2003   Chen 2004/0003111 A1   1/2004   Maeda et al.

OTHER PUBLICATIONS

Ming-Hui Jin, et al. "A Hierarchical Routing Protocal for Large Scale Ad Hoc Network", IEEE International, XP-10323687A, Feb. 1999, pp. 379-385.
T. Clausen, et al., Project Hipercom, "Optimized Link State Routing Protocol (OLSR)," Oct. 2003, RFC3626, pp. 1-74, Internet <URL:www.ietf.org/rfc/rfc3626.txt>.
Bharat Bharagava, et al., "Integrating Heterogeneous Wireless Technologies: A Cellular Aided Mobile Ad hoc Network (CAMA)," ACM Mobile Network and Applications, 2003, pp. 1-12.

* cited by examiner

*Primary Examiner*—Vincent P Harper
*Assistant Examiner*—Michael Irace
(74) *Attorney, Agent, or Firm*—Oblon, Spivak, McClelland, Maier & Neustadt, L.L.P.

(57) ABSTRACT

A mobile communication system is constructed including a plurality of cluster heads, cluster members, a topology management device, and a location management device. Each cluster head exchanges routing information with only each cluster member in a cluster to which the terminal itself (host terminal) belongs, and with only a cluster head in another cluster adjacent to the cluster to which the host terminal belongs. Each cluster member exchanges routing information with only a cluster head in a cluster to which the host terminal belongs. The topology management device and location management device receive the routing information from each cluster head only.

7 Claims, 15 Drawing Sheets

*Fig.3*

ROUTING INFORMATION TABLE OF CLUSTER HEAD #4

| ID | NextHop | Mflag | Hflag |
|---|---|---|---|
| #1 | #2 | 1 | 0 |
| #2 | direct | 1 | 0 |
| ... | ... | ... | ... |
| #9 | #6 | 0 | 1 |
| ... | ... | ... | ... |

*Fig.4*

ROUTING INFORMATION TABLE OF CLUSTER MEMBER #1

| ID | NextHop | Mflag | Hflag |
|----|---------|-------|-------|
| #4 | #2      | 0     | 1     |

*Fig.8*

| ID | CLUSTER HEAD ID |
|---|---|
| #1 | #4 |
| #2 | #4 |
| #3 | #4 |
| #4 | #4 |
| #5 | #4 |
| ... | ... |
| #19 | #17 |
| #20 | #17 |

MOBILE TERMINAL DEVICE, TOPOLOGY MANAGEMENT DEVICE, LOCATION MANAGEMENT DEVICE, AND COMMUNICATION METHOD

BACKGROUND OF THE INVENTION

1. Field of the Invention

The present invention relates to a mobile terminal device, a topology management device, and a location management device in a situation wherein a communication network is comprised of sets of mobile terminal devices, the topology management device, and the location management device, and to a communication method in the communication network.

2. Related Background Art

There are studies on an ad hoc network in which mobile terminal devices, which constitute the network, relay transmitted data among them to implement data transmission in a multihop method among the mobile terminal devices. The known methods of constructing the ad hoc network include a method in which each mobile terminal device autonomously calculates a route to another mobile terminal device (e.g., cf. Document 1 "T. Clausen, P. Jacquet, Project Hipercom, "Optimized Link State Routing Protocol (OLSR)," RFC3626, Internet <URL:www.ietf org/rfc/rfc3626.txt>"). Another known method is one in which a control device different from the mobile terminal devices calculates a route and notifies the mobile terminal devices of the calculated route (e.g., cf. Document 2 "Bharat Bhargava, Xiaoxin Wu, Yi Lu, and Wechao Wang, "Integrating Heterogeneous Wireless Technologies: A Cellular Aided Mobile Ad hoc Network (CAMA),"ACM Mobile Network and Applications, 2003").

In the method wherein each mobile terminal device autonomously calculates the route, for example, as described in the Document 1, the mobile terminal devices constituting the ad hoc network exchange terminal identification information (routing information) on the network with each other. This permits each mobile terminal device to figure out a location where another mobile terminal device is located on the ad hoc network, and thus enables each mobile terminal device to determine a route to the other mobile terminal device.

In the other method wherein the separate control device calculates the route between mobile terminal devices, for example, as described in the Document 2, the control device collects the routing information from all the mobile terminal devices. The control device is able to figure out a location where each mobile terminal device is located on the ad hoc network, based on this routing information, and thus the control device is able to determine a route between mobile terminal devices.

SUMMARY OF THE INVENTION

However, when the autonomous route calculation method by each mobile terminal device is applied to a large-scale ad hoc network consisting of a great number of mobile terminal devices, control signals necessary for the exchange of routing information among the mobile terminal devices tend to increase explosively. This results in posing a problem that a heavy load is imposed on each mobile terminal device forming the ad hoc network. On the other hand, the route calculation method by the control device tends to impose a load caused by the route calculation, intensively on the control device and this results in posing a problem that a heavy load is imposed on the control device.

The present invention has been accomplished in view of the above circumstances and an object of the invention is to provide a mobile terminal device, a topology management device, a location management device, and a communication method capable of appropriately spreading the load due to the calculation of a route between mobile terminal devices constituting a mobile communication system, across the mobile terminal devices and control devices and thereby preventing the load from being imposed intensively on a specific device.

In order to solve the above problem, a mobile terminal device according to the present invention is a mobile terminal device in a situation in which a communication network is comprised of a set of mobile terminal devices, a topology management device, and a location management device, the mobile terminal device comprising: routing information receiving means for receiving representative terminal identification information to identify a location on the communication network of a representative mobile terminal device as a representative of the set to which the mobile terminal device itself (host mobile terminal device) belongs, from the representative mobile terminal device; routing information storing means for storing the representative terminal identification information received by the routing information receiving means, and host terminal identification information to identify a location on the communication network of the host mobile terminal device; routing information transmitting means for reading the representative terminal identification information and the host terminal identification information out of the routing information storing means and for transmitting the host terminal identification information to the representative mobile terminal device on the basis of the representative terminal identification information; and data transmitting means for reading the representative terminal identification information out of the routing information storing means and for transmitting transmitted data to the representative mobile terminal device on the basis of the representative terminal identification information.

The mobile terminal device of the present invention as described above is configured as follows: when the host mobile terminal device is not a representative mobile terminal device in the set forming the communication network, the host mobile terminal device exchanges the routing information necessary for execution of data communication with only the representative mobile terminal device in the set to which the host device belongs. Namely, the host mobile terminal device retains only the routing information of the representative mobile terminal device in the set to which the host device belongs, and transmits the routing information of the host device to only the representative mobile terminal device in the set to which the host device belongs. This reduces the volume of routing information exchanged among the mobile terminal devices constituting the communication network, and reduces the load on each mobile terminal device not being a representative of a set.

The mobile terminal device of the present invention is preferably configured as follows: the mobile terminal device further comprises topology registration transmitting means for reading the host terminal identification information as the representative terminal identification information, and other representative terminal identification information to identify a location on the communication network of an other representative mobile terminal device as a representative of an other set adjacent to the set to which the host mobile terminal device belongs, out of the routing information storing means and for transmitting the host terminal identification information and the other representative terminal identification information to the topology management device; location registration transmitting means for reading the host terminal identification information as the representative terminal identification information, and nonrepresentative terminal identification information to identify a location on the communication network of a nonrepresentative mobile terminal device not representing the set to which the host mobile terminal device belongs, out of the routing information storing means and for transmitting the host terminal identification information and the nonrepresentative terminal identification information to the location management device; and topology information receiving means for receiving from the topology management device, topology information to indicate a route on the communication network from a source representative mobile terminal device as a representative of a set to which a source mobile terminal device as a source of transmitted data belongs, to a destination representative mobile terminal device as a representative of a set to which a destination mobile terminal device as a destination of the transmitted data belongs; the routing information receiving means receives the other representative terminal identification information from the other representative mobile terminal device and receives the nonrepresentative terminal identification information from the nonrepresentative mobile terminal device; the routing information storing means stores the other representative terminal identification information and the nonrepresentative terminal identification information received by the routing information receiving means; the routing information transmitting means transmits the host terminal identification information as the representative terminal identification information to the nonrepresentative mobile terminal device and to the other representative mobile terminal device; and the data transmitting means transmits the transmitted data to the destination representative mobile terminal device on the basis of the topology information received by the topology information receiving means, transmits the transmitted data to the other representative mobile terminal device on the basis of the other representative terminal identification information stored in the routing information storing means, and transmits the transmitted data to the nonrepresentative mobile terminal device on the basis of the nonrepresentative terminal identification information stored in the routing information storing means.

According to this invention, when the host mobile terminal device is a representative mobile terminal device in the set forming the communication network, the host mobile terminal device exchanges the routing information necessary for execution of data communication with only the other representative mobile terminal device of the other set adjacent to the set to which the host device belongs, and the nonrepresentative mobile terminal device in the set to which the host device belongs. Namely, the host mobile terminal device retains only the routing information of the other representative mobile terminal device of the other set adjacent to the set to which the host device belongs, and the routing information of the nonrepresentative mobile terminal device in the set to which the host device belongs, and transmits the routing information of the host device to the other representative mobile terminal device and the nonrepresentative mobile terminal device only. This reduces the volume of routing information exchanged among the mobile terminal devices constituting the communication network, and reduces the load on the mobile terminal device as a representative of a set.

According to this invention, the topology registration transmitting means transmits the representative terminal identification information and the other representative terminal identification information to the topology management device and the location registration transmitting means transmits the representative terminal identification information and the nonrepresentative terminal identification information to the location management device. When the source mobile terminal device itself does not retain the route on the communication network to the destination mobile terminal device, it contacts the topology management device and the location management device to receive the necessary route information and thereby acquire the route to the destination mobile terminal device, and thus becomes able to appropriately transmit the transmitted data.

In the mobile terminal device of the present invention, preferably, the topology registration transmitting means transmits the host terminal identification information as the representative terminal identification information, and specific other representative terminal identification information to the topology management device. According to this invention, the topology registration transmitting means transmits only the specific other representative terminal identification information, for example, restricted according to a predetermined rule, as the other representative terminal identification information to the topology management device. Therefore, it reduces the volume of information transmitted from the mobile terminal device to the topology management device and reduces the load on the mobile terminal device.

A topology management device according to the present invention is a topology management device in a situation in which a communication network is comprised of a set of mobile terminal devices, the topology management device, and a location management device, the topology management device comprising: topology registration receiving means for receiving representative terminal identification information to identify a location on the communication network of a representative mobile terminal device as a representative of the set, and other representative terminal identification information to identify a location on the communication network of an other representative mobile terminal device as a representative of an other set adjacent to the set on the communication network, from the representative mobile terminal device; topology information storing means for storing the representative terminal identification information and the other representative terminal identification information received by the topology registration receiving means; location information receiving means for receiving source representative terminal identification information to identify a location on the communication network of a source representative mobile terminal device as a representative of a set to which a source mobile terminal device as a source of transmitted data belongs, and destination terminal identification information to identify a location on the communication network of a destination mobile terminal device as a destination of the transmitted data, from the source representative mobile terminal device and for receiving destination representative terminal identification information to identify a location on the communication network of a destination representative mobile terminal device as a representative of a set to which the destination mobile terminal device belongs, from the location management device; and topology calculating means for calculating topology information to indicate a route on the communication network from the source representative mobile terminal device to the destination representative mobile terminal device, based on the source representative terminal identification information and the destination representative terminal identification information received by the location information receiving means, with reference to the representative terminal identification information and the other representative terminal identification information stored in the topology information storing means, and for transmitting the calculated topology information to the source representative mobile terminal device.

In the topology management device of the present invention as described above, the topology registration receiving means receives the representative terminal identification information and the other representative terminal identification information, i.e., information to indicate a positional relation between the mobile terminal devices as representatives in the communication network. The topology information storing means stores the information received by the topology registration receiving means. Then the topology calculating means calculates the route between the representative mobile terminal devices in the communication network with reference to the representative terminal identification information and the other representative terminal identification information stored in the topology information storing means, and can transmit the calculated route information, for example, to the source representative mobile terminal device not retaining the route to the destination mobile terminal device.

The topology management device transmits and receives the information to and from only the mobile terminal devices as representatives among the plurality of mobile terminal devices constituting the communication network. Therefore, it reduces the volume of information transmitted and received by the topology management device and reduces the load on the topology management device.

In the topology management device of the present invention, preferably, the topology registration receiving means receives the representative terminal identification information, and specific other representative terminal identification information from the representative mobile terminal device, and the topology information storing means stores the representative terminal identification information received by the topology registration receiving means, as the specific other representative terminal identification information and stores the specific other representative terminal identification information received by the topology registration receiving means, as the representative terminal identification information. According to this invention, the topology registration receiving means receives only the specific other representative terminal identification information, for example, restricted according to a predetermined rule, as the other representative terminal identification information from the representative mobile terminal device. Therefore, it reduces the volume of information transmitted from the representative mobile terminal device and received by the topology management device, and reduces the load on the topology management device.

A location management device according to the present invention is a location management device in a situation in which a communication network is comprised of a set of mobile terminal devices, a topology management device, and the location management device, the location management device comprising: location registration receiving means for receiving representative terminal identification information to identify a location on the communication network of a representative mobile terminal device as a representative of the set, and nonrepresentative terminal identification information to identify a location on the communication network of a nonrepresentative mobile terminal device not representing the set, from the representative mobile terminal device; location information storing means for storing the representative terminal identification information and the nonrepresentative terminal identification information received by the location registration receiving means; and location information searching means for reading representative terminal identification information in a set to which an arbitrary nonrepresentative mobile terminal device belongs, out of the location information storing means and for transmitting the read representative terminal identification information to the topology management device.

In the location management device of the present invention as described above, the location registration receiving means receives the representative terminal identification information and the nonrepresentative terminal identification information, i.e., information to indicate a positional relation between the mobile terminal device a representative of an arbitrary set forming the communication network, and the mobile terminal device not representing a set. The location information storing means stores the information received by the location registration receiving means. Then the location information searching means reads, for example, destination representative terminal identification information in a set to which an arbitrary destination mobile terminal device belongs, with reference to the representative terminal identification information and the nonrepresentative terminal identification information stored in the location information storing means, and can transmit it to the topology management device.

The location management device receives the information from only the representative mobile terminal device among the plurality of mobile terminal devices constituting the communication network. Therefore, it reduces the volume of information received by the location management device and reduces the load on the location management device.

Incidentally, while the present invention can be described as the invention of the mobile terminal device, topology management device, and location management device as described above, the invention can also be described as the invention of a communication method as described below. It is noted that this is different only in category but substantially the same invention with similar action and effect.

A communication method according to the present invention is a communication method in a communication network which is comprised of a set of mobile terminal devices, a topology management device, and a location management device, the communication method comprising: a routing information receiving step wherein routing information receiving means of a first mobile terminal device receives representative terminal identification information to identify a location on the communication network of a representative mobile terminal device as a representative of the set to which the first mobile terminal device itself (host mobile terminal device) belongs, from the representative mobile terminal device, receives other representative terminal identification information to identify a location on the communication network of an other representative mobile terminal device as a representative of an other set adjacent to the set to which the host mobile terminal device belongs, on the communication network, from the other representative mobile terminal device, and receives nonrepresentative terminal identification information to identify a location on the communication network of a nonrepresentative mobile terminal device not representing the set to which the host mobile terminal device belongs, from the nonrepresentative mobile terminal device; a routing information storing step wherein routing information storing means of the first mobile terminal device stores host terminal identification information to identify a location on the communication network of the host mobile terminal device, and stores the representative terminal identification information, the other representative terminal identification information, and the nonrepresentative terminal identification information received in the routing information receiving step; a routing information transmitting step wherein routing information transmitting means of the first mobile terminal device transmits the host terminal identification information as the nonrepresentative terminal identification information to the representative mobile terminal device and transmits the host terminal identification information as the representative terminal identification information to the nonrepresentative mobile terminal device and to the other representative mobile terminal device; a topology registration transmitting step wherein topology registration transmitting means of the first mobile terminal device transmits the host terminal identification information as the representative terminal identification information, and the other representative terminal identification information to the topology management device; a topology registration receiving step wherein topology registration receiving means of the topology management device receives the representative terminal identification information and the other representative terminal identification information transmitted in the topology registration transmitting step; a topology information storing step wherein topology information storing means of the topology management device stores the representative terminal identification information and the other representative terminal identification information received in the topology registration receiving step; a location registration transmitting step wherein location registration transmitting means of the first mobile terminal device transmits the host terminal identification information as the representative terminal identification information, and the non-representative terminal identification information to the location management device; a location registration receiving step wherein location registration receiving means of the location management device receives the representative terminal identification information and the nonrepresentative terminal identification information transmitted in the location registration transmitting step; a location information storing step wherein location information storing means of the location management device stores the representative terminal identification information and the nonrepresentative terminal identification information received in the location registration receiving step; a location information searching step wherein location information searching means of the location management device reads representative terminal identification information in a set to which an arbitrary nonrepresentative mobile terminal device belongs, from the representative terminal identification information stored in the location information storing step, and transmits the read representative terminal identification information to the topology management device; a location information receiving step wherein location information receiving means of the topology management device receives source representative terminal identification information to identify a location on the communication network of a source representative mobile terminal device as a representative of a set to which a source mobile terminal device as a source of transmitted data belongs, and destination terminal identification information to identify a location on the communication network of a destination mobile terminal device as a destination of the transmitted data, from the source representative mobile terminal device, and receives destination representative terminal identification information to identify a location on the communication network of a destination representative mobile terminal device as a representative of a set to which the destination mobile terminal device belongs, from the location management device through the location information searching step; a topology calculating step wherein topology calculating means of the topology management device calculates topology information to indicate a route on the communication network from the source representative mobile terminal device to the destination representative mobile terminal device, based on the source representative terminal identification information and the destination representative terminal identification information received in the location information receiving step, with reference to the representative terminal identification information and the other representative terminal identification information stored in the topology information storing step, and transmits the calculated topology information to the source representative mobile terminal device; a topology information receiving step wherein topology information receiving means of the first mobile terminal device receives the topology information calculated in the topology calculating step, from the topology management device; and a data transmitting step wherein data transmitting means of the first mobile terminal device transmits the transmitted data to the destination representative mobile terminal device on the basis of the topology information received in the topology information receiving step, transmits the transmitted data to the other representative mobile terminal device on the basis of the other representative terminal identification information received in the routing information receiving step, transmits the transmitted data to the nonrepresentative mobile terminal device on the basis of the nonrepresentative terminal identification information received in the routing information receiving step, and transmits the transmitted data to the representative mobile terminal device on the basis of the representative terminal identification information received in the routing information receiving step.

The communication method of the present invention is also preferably arranged as follows: in the topology registration transmitting step the topology registration transmitting means of the first mobile terminal device transmits the host terminal identification information as the representative terminal identification information, and specific other representative terminal identification information to the topology management device; in the topology registration receiving step the topology registration receiving means of the topology management device receives the representative terminal identification information and the specific other representative terminal identification information transmitted in the topology registration transmitting step; and in the topology information storing step the topology information storing means of the topology management device stores the representative terminal identification information received in the topology registration receiving step, as the specific other representative terminal identification information and stores the specific other representative terminal identification information received in the topology registration receiving step, as the representative terminal identification information.

The present invention appropriately spreads the load due to the route calculation between mobile terminal devices forming the mobile communication system, across the mobile terminal devices, the topology management device, and the location management device and prevents the load from being imposed intensively on a specific device.

BRIEF DESCRIPTION OF THE DRAWINGS

FIG. 3 is an example of a routing information table stored in mobile terminal device 10 as a cluster head 10a.

FIG. 4 is an example of a routing information table stored in mobile terminal device 10 as a cluster member 10b.

FIG. 8 is an example of location registration information stored in location management device 30 in FIG. 7.

DESCRIPTION OF THE PREFERRED EMBODIMENTS

Figure 1:
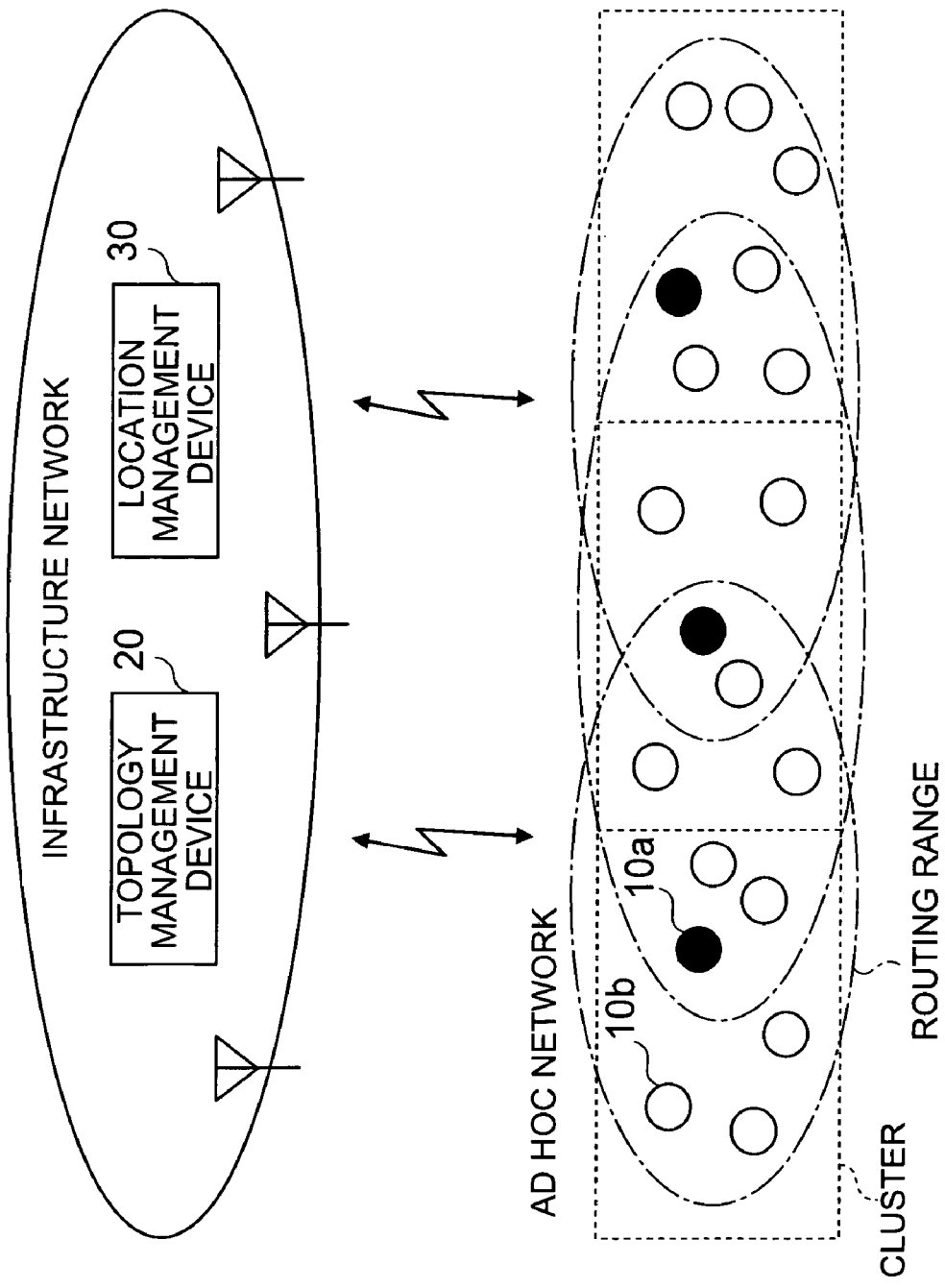
FIG. 1 is a schematic diagram to illustrate a configuration of mobile communication system 1 in the first embodiment.

The expertise of the present invention can be readily understood in view of the following detailed description with reference to the accompanying drawings presented by way of illustration only. Subsequently, embodiments of the present invention will be described with reference to the accompanying drawings. The embodiments of the present invention will be described below using an example of a situation in which a mobile communication system (communication network) 1 shown in FIG. 1 is comprised of mobile terminal devices 10 (generics term of 10a, 10b), topology management device 20, and location management device 30 according to the present invention. The same portions will be denoted by the same reference symbols as much as possible, without redundant description.

First Embodiment

First, a configuration of mobile communication system 1 according to the first embodiment of the present invention will be described with reference to FIG. 1. As shown in FIG. 1, the mobile communication system 1 is comprised of a plurality of mobile terminal devices 10a, 10b located on an ad hoc network, and topology management device 20 and location management device 30 installed on an infrastructure network. Each of the components of this mobile communication system 1 will be described below in detail.

First, a mobile terminal device 10 will be described. The mobile terminal device 10 is a mobile communication terminal with a wireless communication function, e.g., a cell phone, a PDA (Personal Digital Assistant), a notebook PC, or the like. This mobile terminal device 10 is configured to be able to communicate with other mobile terminal devices (hereinafter referred to as "other terminals") within a range where radio waves can propagate. The mobile terminal device 10 is configured to be able to communicate through the infrastructure network with the topology management device 20 and with the location management device 30.

As shown in FIG. 1, a set of mobile terminal devices 10 form a cluster. This cluster is comprised of one mobile terminal device 10a as a representative (representative mobile terminal device, which will be referred to as "cluster head 10a") and at least one mobile terminal device 10b as a member (nonrepresentative mobile terminal device, which will be referred to as "cluster member 10b").

For forming a cluster as described above, the first embodiment adopts a method of defining mobile terminal devices existing in a specific location registration area in a certain mobile communication system, as mobile terminal devices belonging to the cluster. Another applicable method is, for example, a method of forming a cluster by defining mobile terminal devices existing in a communicable area with a specific base station in a certain mobile communication system, as mobile terminal devices belonging to the cluster. Still another applicable method is to form a cluster by defining mobile terminal devices owned by specific users, as mobile terminal devices belonging to the cluster. A further applicable method is to form a cluster by defining mobile terminal devices held by a plurality of users with similar preference, as mobile terminal devices belonging to the cluster. One of these cluster forming methods can be properly selected in view of simplicity of implementation or the like.

For determining the cluster head 10a, the first embodiment adopts a method of selecting as the cluster head 10a, a mobile terminal device capable of communicating with the topology management device 20 and with the location management device 30 among the mobile terminal devices 10 belonging to the cluster. For example, in a case where there are a plurality of mobile terminal devices capable of communicating with the topology management device 20 and with the location management device 30, a mobile terminal device with higher performance than the other terminals in terms of its battery, CPU (Central Processing Unit), and so on is selected as the cluster head 10a. Among such determination methods of cluster head 10a, one of them can be properly selected in view of simplicity of implementation or the like, e.g., a method of preliminarily determining a specific mobile terminal device as a fixed cluster head.

The mobile terminal device 10 is configured to be able to find out a route to a neighbor mobile terminal device, using a known routing protocol, e.g., the OLSR (Optimized Link State Routing Protocol) or the like. In this case, each cluster member 10b retains at least a route to the cluster head 10a in the cluster to which the cluster member 10b itself belongs. On the other hand, the cluster head 10a retains a route to every cluster member 10b in the cluster to which the cluster head 10a itself belongs, and a route to a cluster head in a neighbor cluster. As described above, each mobile terminal device does not have to know routes to all the other terminals in the mobile communication system 1, and retains only a route to another terminal within a limited range, e.g., a range of several hops around it. This limited range can be searched, for example, by GPS (Global Positioning System) or the like. It is, however, contemplated that the GPS-based method is so arranged that routing information sent from a terminal at certain coordinates is relayed by only terminals within a certain coordinate range.

Figure 2:
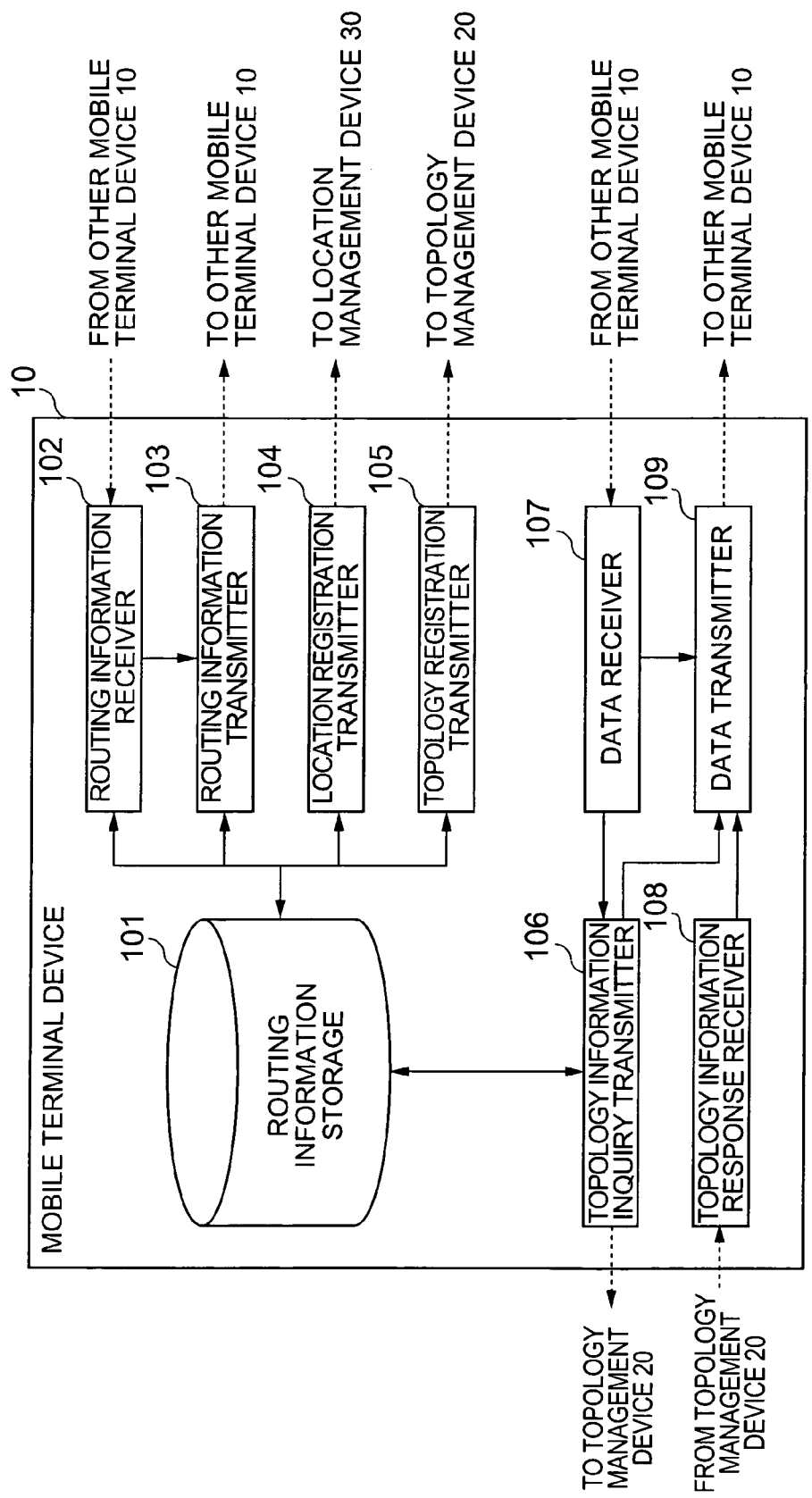
FIG. 2 is a schematic diagram to illustrate a configuration of mobile terminal device 10 in FIG. 1.

FIG. 2 is a schematic diagram to illustrate a configuration of mobile terminal device 10. As shown in FIG. 2, the mobile terminal device 10 is comprised of routing information storage 101 (routing information storing means), routing information receiver 102 (routing information receiving means), routing information transmitter 103 (routing information transmitting means), location registration transmitter 104 (location registration transmitting means), topology registration transmitter 105 (topology registration transmitting means), topology information inquiry transmitter 106, data receiver 107, topology information response receiver 108 (topology information receiving means), and data transmitter 109 (data transmitting means). In the description hereinafter, the mobile terminal device 10 as a cluster head 10a includes the routing information storage 101, routing information receiver 102, routing information transmitter 103, location registration transmitter 104, topology registration transmitter 105, topology information inquiry transmitter 106, data receiver 107, topology information response receiver 108, and data transmitter 109, while the mobile terminal device 10 not serving as a cluster head 10a may be constructed including the routing information storage 101, routing information receiver 102, routing information transmitter 103, data receiver 107, and data transmitter 109. Each of the components of this mobile terminal device 10 will be described below in detail.

The routing information receiver 102 is a part that receives routing information transmitted from routing information transmitter 103 of another terminal. When the mobile terminal device 10 itself (hereinafter referred to as "host terminal") is a cluster head 10a, the routing information receiver 102 receives routing information (nonrepresentative terminal identification information) of each cluster member 10b belonging to the same as the cluster to which the host terminal belongs, from the cluster member 10b, and receives routing information (other representative terminal identification information) of a cluster head (other representative mobile terminal device) in another cluster adjacent to the cluster to which the host terminal belongs, from the cluster head. When the host terminal is a cluster member 10b, the routing information receiver 102 receives routing information (representative terminal identification information) of a cluster head 10a belonging to the same as the cluster to which the host terminal belongs, from the cluster head 10a.

The routing information received by the routing information receiver 102 contains an ID to identify the other terminal in the mobile communication system 1, an ID of a terminal having relayed the routing information, Mflag being a flag to determine whether the other terminal is a cluster member 10b, and Hflag being a flag to determine whether the other terminal is a cluster head 10a. Mflag and Hflag are flags that indicate the affirmative with the value of 1 and the negative with the value of 0. The routing information receiver 102 outputs the received routing information to the routing information storage 101. Furthermore, NextHop to be outputted is a terminal ID of a terminal last having forwarded the routing information.

The routing information storage 101 is a part that stores the routing information fed from the routing information receiver 102. FIGS. 3 and 4 show an example of the routing information stored in the routing information storage 101. FIG. 3 is an example of a routing information table of cluster head #4 stored in the routing information storage 101, for example, in a situation where the mobile terminal device 10 with the ID of #4 is a cluster head 10a. FIG. 4 is an example of a routing information table of cluster member #1 stored in the routing information storage 101, for example, in a situation in which the mobile terminal device 10 with the ID of #1 is a cluster member 10b.

FIG. 3 shows the routing information table of cluster head #4, and indicates that the cluster head #4 has the mobile terminal devices 10 with the IDs of #1, #2, etc. as cluster members 10b. This is apparent from the fact that the mobile terminal devices 10 with the IDs of #1, #2, etc. have Mflag with the value of 1 and Hflag with the value of 0. FIG. 3 also indicates that the mobile terminal device 10 with the ID of #9 is a cluster head in a cluster adjacent to the cluster to which the cluster head #4 belongs. This is apparent from the fact that the mobile terminal device 10 with the ID of #9 has Mflag with the value of 0 and Hflag with the value of 1.

Furthermore, FIG. 3 shows that the routing information or transmitted data directed to the mobile terminal device with the ID of #1 is routed first via the mobile terminal device with the ID of #2. This is apparent from the fact that NextHop of the mobile terminal device with the ID of #1 is a value indicating #2. Similarly, it can be seen that the routing information or transmitted data directed to the mobile terminal device with the ID of #9 is routed first via the mobile terminal device with the ID of #6. On the other hand, FIG. 3 also indicates that the routing information or transmitted data directed to the mobile terminal device with the ID of #2 is transmitted directly without intervention of another terminal. This can be seen from the fact that NextHop of the mobile terminal device with the ID of #2 is a value indicating "directs".

FIG. 4 shows the routing information table of cluster member #1, and indicates that the cluster member #1 has the mobile terminal device with the ID of #4 as a cluster head 10a. This is apparent from the fact that the mobile terminal device with the ID of #4 has Mflag with the value of 0 and Hflag with the value of 1. Furthermore, FIG. 4 indicates that the routing information or transmitted data directed to the mobile terminal device with the ID of #4 is routed first via the mobile terminal device with the ID of #2. This can be known from the fact that NextHop of the mobile terminal device with the ID of #4 is a value indicating #2.

The routing information transmitter 103 is a part that transmits the routing information of the host terminal to the routing information receiver 102 of another terminal. When the host terminal is a cluster head 10a, the routing information transmitter 103 transmits the routing information of the host terminal (host terminal identification information) to the routing information receiver 102 of cluster member 10b in the cluster to which the host terminal belongs, and to the routing information receiver 102 of a cluster head in another cluster adjacent to the cluster to which the host terminal belongs. When the host terminal is a cluster member 10b, the routing information transmitter 103 transmits the routing information of the host terminal (host terminal identification information) to the routing information receiver 102 of the cluster head 10a in the cluster to which the host terminal belongs.

The routing information transmitted by the routing information transmitter 103 contains an ID to identify the host terminal in the mobile communication system 1, Mflag being a flag to determine whether the host terminal is a cluster member 10b, Hflag being a flag to determine whether the host terminal is a cluster head 10a, and an ID of a terminal having forwarded the routing information. Mflag and Hflag are flags that indicate the affirmative with the value of 1 and the negative with the value of 0. The routing information transmitter 103 extracts the routing information of the host terminal from the routing information storage 101 and transmits the routing information to the routing information receiver 102 of another terminal.

When the host terminal is a cluster head 10a, the topology registration transmitter 105 refers to the routing information storage 101 to transmit the ID of the host terminal and an ID of a cluster head in another cluster adjacent to the cluster to which the host terminal belongs, as topology registration information to the topology management device 20. Concerning the ID of the cluster head in another cluster adjacent to the cluster to which the host terminal belongs, the topology registration transmitter 105 refers to the routing information storage 101 to search the routing information table for an ID of another terminal having Hflag with the value of 1, and transmits the relevant ID. Specifically, in the case of FIG. 3 where the routing information table is that of the cluster head #4, the topology registration transmitter 105 of the cluster head #4 transmits #4 as the ID of the host terminal to the topology management device 20, and transmits #9 as the ID of the cluster head in another cluster adjacent to the cluster to which the host terminal belongs, to the topology management device 20. Concerning the timing when the topology registration transmitter 105 transmits the IDs to the topology management device 20, the first embodiment adopts a method of regularly transmitting them at intervals of a predetermined time. Besides it, the transmission timing can be properly selected in view of simplicity of implementation, convenience of use, etc., e.g., a method of transmitting the IDs with a change of the cluster head.

When the host terminal is a cluster head 10a, the location registration transmitter 104 refers to the routing information storage 101 to transmit the ID of the host terminal and an ID of each cluster member 10b in the cluster to which the host terminal belongs, as location registration information to the location management device 30. Concerning the ID of each cluster member 10b in the cluster to which the host terminal belongs, the location registration transmitter 104 refers to the routing information storage 101 to search the routing information table for an ID of another terminal having Mflag with the value of 1, and transmits each relevant ID. Specifically, in the case of FIG. 3 where the routing information table is that of the cluster head #4, the location registration transmitter 104 of the cluster head #4 transmits #4 being the ID of the host terminal, as the ID of the cluster head 10a to the location management device 30, and transmits #1, #2, etc. as IDs of cluster members 10b in the cluster to which the host terminal belongs, to the location management device 30. For the transmission timing when the location registration transmitter 104 transmits the IDs to the location management device 30, the first embodiment adopts a method of regularly transmitting them at intervals of a predetermined time. Besides it, the transmission timing can be properly selected in view of simplicity of implementation, convenience of use, etc., e.g., a method of transmitting them with a change of the cluster head and the cluster members.

The data transmitter 109 is a part that transmits transmitted data of the host terminal to the data receiver 107 of another terminal. When the host terminal is designated as NextHop to another terminal, the data transmitter 109 forwards transmitted data from another terminal, received by the data receiver 107, to the data receiver 107 of still another terminal. When the host terminal is a cluster head 10a, the data transmitter 109 refers to the routing table stored in the routing information storing means and transmits the transmitted data to the data receiver 107 of a cluster member 10b in the cluster to which the host terminal belongs, and to the cluster head in another cluster adjacent to the cluster to which the host terminal belongs. When the host terminal is a cluster member 10b, the data transmitter 109 refers to the routing table stored in the routing information storing means and transmits the transmitted data to the data receiver 107 of the cluster head 10a in the cluster to which the host terminal belongs.

The data receiver 107 is a part that receives transmitted data from another terminal. When the host terminal is designated as NextHop to another terminal, the data receiver 107 outputs the transmitted data from another terminal received, to the data transmitter 109. When the host terminal is a cluster head 10a, the data receiver 107 receives the transmitted data from the data transmitter 109 of a cluster member 10b in the cluster to which the host terminal belongs, and from the data transmitter 109 of a cluster head in another cluster adjacent to the cluster to which the host terminal belongs. When the host terminal is a cluster member 10b, the data receiver 107 receives the transmitted data from the data transmitter 109 of the cluster head 10a in the cluster to which the host terminal belongs.

The topology information inquiry transmitter 106 is a part that is configured as follows: in a situation where the data receiver 107 receives transmitted data from another terminal and where the data transmitter 109 forwards the transmitted data to still another terminal (destination mobile terminal device), when the routing information storage 101 does not retain a route (topology information) to a cluster head (destination representative mobile terminal device) in a cluster to which the still another terminal belongs, the topology information inquiry transmitter 106 sends an inquiry about the route to the topology management device 20. Specifically, for example, in a situation where the host terminal (source representative mobile terminal device) retains the routing information table shown in FIG. 3, when transmitted data is forwarded from the mobile terminal device with the ID of #1 (source mobile terminal device) to a mobile terminal device with an ID of #20, the routing information table does not contain a route to a cluster head in a cluster to which the mobile terminal device #20 belongs. At this time, the data transmitter 109 outputs an inquiry signal of topology information to inquire the information about the route to the cluster head in the cluster to which the mobile terminal device #20 belongs, to the topology information inquiry transmitter 106. Then the topology information inquiry transmitter 106 transmits the inquiry signal of topology information to the topology management device 20.

The topology information response receiver 108 is a part that receives topology information about a route from the host terminal to a cluster head in a cluster to which another terminal of a destination belongs, from the topology management device 20. When the topology information response receiver 108 outputs the topology information received from the topology management device 20, to the data transmitter 109, the data transmitter 109 becomes able to transmit the transmitted data to the cluster head in the cluster to which the destination mobile terminal device belongs, with reference to the route information.

Next, the topology management device 20 will be described. The topology management device 20 is a device that manages topologies in the mobile communication system 1, and that has a function of managing connection relations on the ad hoc network among cluster heads forming the mobile communication system 1. The topology management device 20 has, for example, a function of creating a list of intervening cluster heads from a first cluster head to a second cluster head and notifying the first cluster head of the created list.

Figure 5:
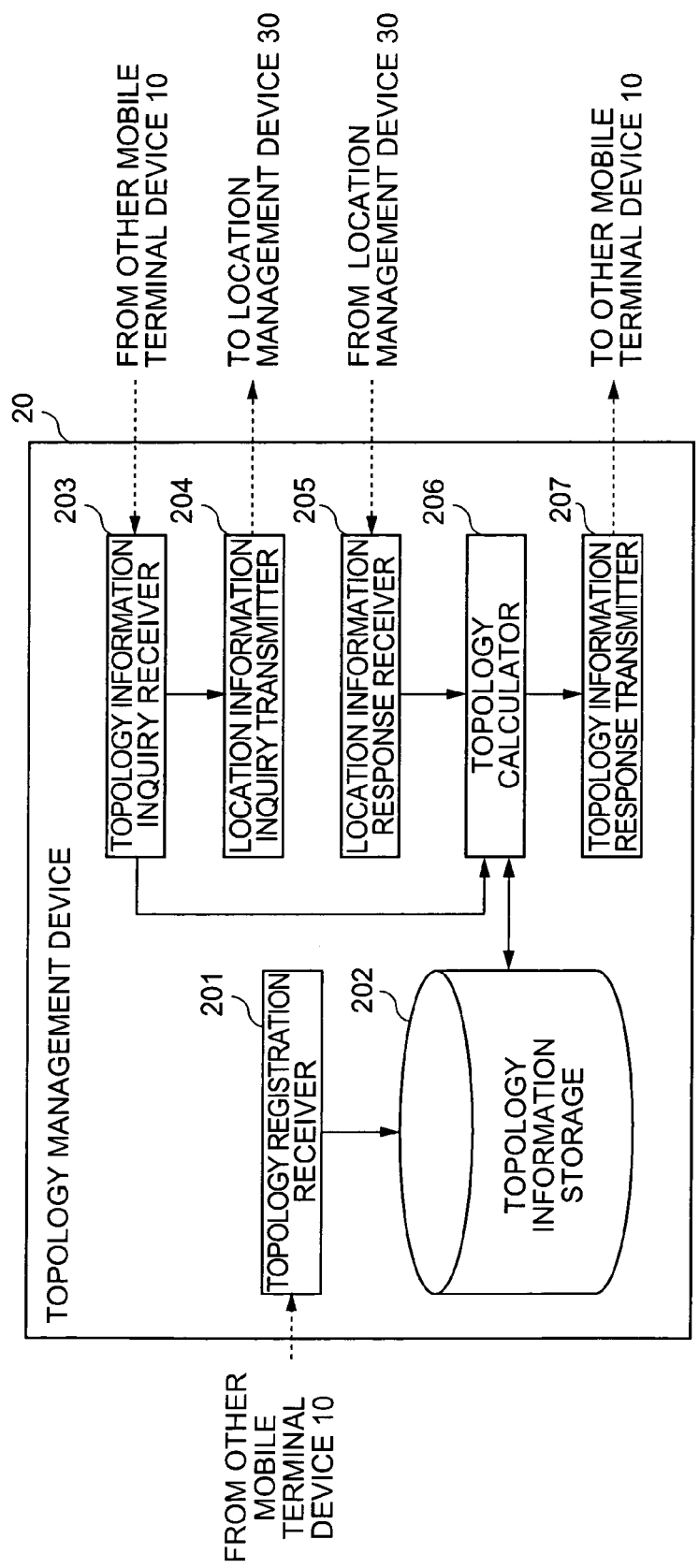
FIG. 5 is a schematic diagram to illustrate a configuration of topology management device 20 in FIG. 1.

FIG. 5 is a schematic diagram to illustrate a configuration of the topology management device 20. As shown in FIG. 5, the topology management device 20 is comprised of topology registration receiver 201 (topology registration receiving means), topology information storage 202 (topology information storing means), topology information inquiry receiver 203, location information inquiry transmitter 204, location information response receiver 205 (location information receiving means), and topology calculator 206 and topology information response transmitter 207 (topology calculating means). Each of the components of this topology management device 20 will be described below in detail.

The topology registration receiver 201 is a part that receives the topology registration information transmitted from the topology registration transmitter 105 of cluster head 10a. This topology registration information contains an ID of the cluster head 10a and an ID of a cluster head in another cluster adjacent to the cluster to which the cluster head 10a belongs. The topology registration receiver 201 outputs the received topology registration information to the topology information storage 202.

Figure 6:
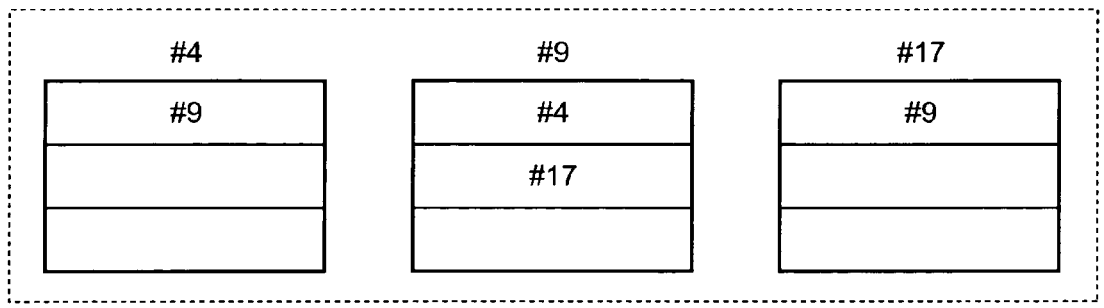
FIG. 6 is an example of topology registration information stored in topology management device 20 in FIG. 5.

The topology information storage 202 is a part that stores the topology registration information fed from the topology registration receiver 201. FIG. 6 shows an example of the topology registration information stored in the topology information storage 202. As shown in FIG. 6, the topology information storage 202 stores one topology information table for each cluster head. Each topology information table stores an ID of a cluster head in each other cluster adjacent to a cluster to which a cluster head of interest belongs. Namely, FIG. 6 indicates, for example, that a cluster of cluster head #9 is adjacent to a cluster of cluster head #4 and to a cluster of cluster head #17.

The topology information inquiry receiver 203 is a part that receives an inquiry signal of topology information from the topology information inquiry transmitter 106 of cluster head 10a. When a cluster head 10a sends an inquiry about topology information, it sends an ID of the host terminal and an ID of another terminal of a destination to the topology information inquiry receiver 203. The topology information inquiry receiver 203 outputs the received ID of the host terminal from the cluster head 10a, to the topology calculator 206 and outputs the ID of the other terminal of the destination to the location information inquiry transmitter 204.

When the location information inquiry transmitter 204 receives the ID of the other terminal of the destination from the topology information inquiry receiver 203, it transmits the ID of the other terminal of the destination as an inquiry signal of location information to the location management device 30, thereby inquiring of the location management device 30 an ID of a cluster head in a cluster to which the other terminal of the destination belongs.

The location information response receiver 205 is a part that receives the ID of the cluster head in the cluster to which the other terminal of the destination belongs, transmitted from the location management device 30, as a location information response to the inquiry about the location information transmitted to the location management device 30 by the location information inquiry transmitter 204. The location information response receiver 205 outputs the received location information response to the topology calculator 206.

The topology calculator 206 is a part that uses the ID fed from the topology information inquiry receiver 203, as an ID of a source cluster head and the location information response fed from the location information response receiver 205, as an ID of a destination cluster head, and that refers to the topology information tables stored in the topology information storage 202 to create a list of intervening cluster heads from the source cluster head to the destination cluster head. This list is created, for example, by the well-known Dijkstra's algorithm. Specifically, for example, in a situation where the ID of the destination cluster head is #17 and where the ID of the source cluster head is #4, the topology calculator 206 first refers to the topology information table of the source cluster head #4 (cf. FIG. 6). Since the topology information table of the cluster head #4 includes the entry of cluster head #9, the topology calculator 206 then refers to the topology information table of the cluster head #9. The topology information table of the cluster head #9 includes the entry of cluster head #17. Therefore, it is found that the intervening cluster heads from the cluster head #4 to the cluster head #17 are the cluster heads #4, #9, and #17. The topology calculator 206 outputs the list created in this manner, to the topology information response transmitter 207.

The topology information response transmitter 207 is a part that transmits the above-described list fed from the topology calculator 206, as a response to the inquiry about topology information to the cluster head 10a having sent the inquiry.

Figure 7:
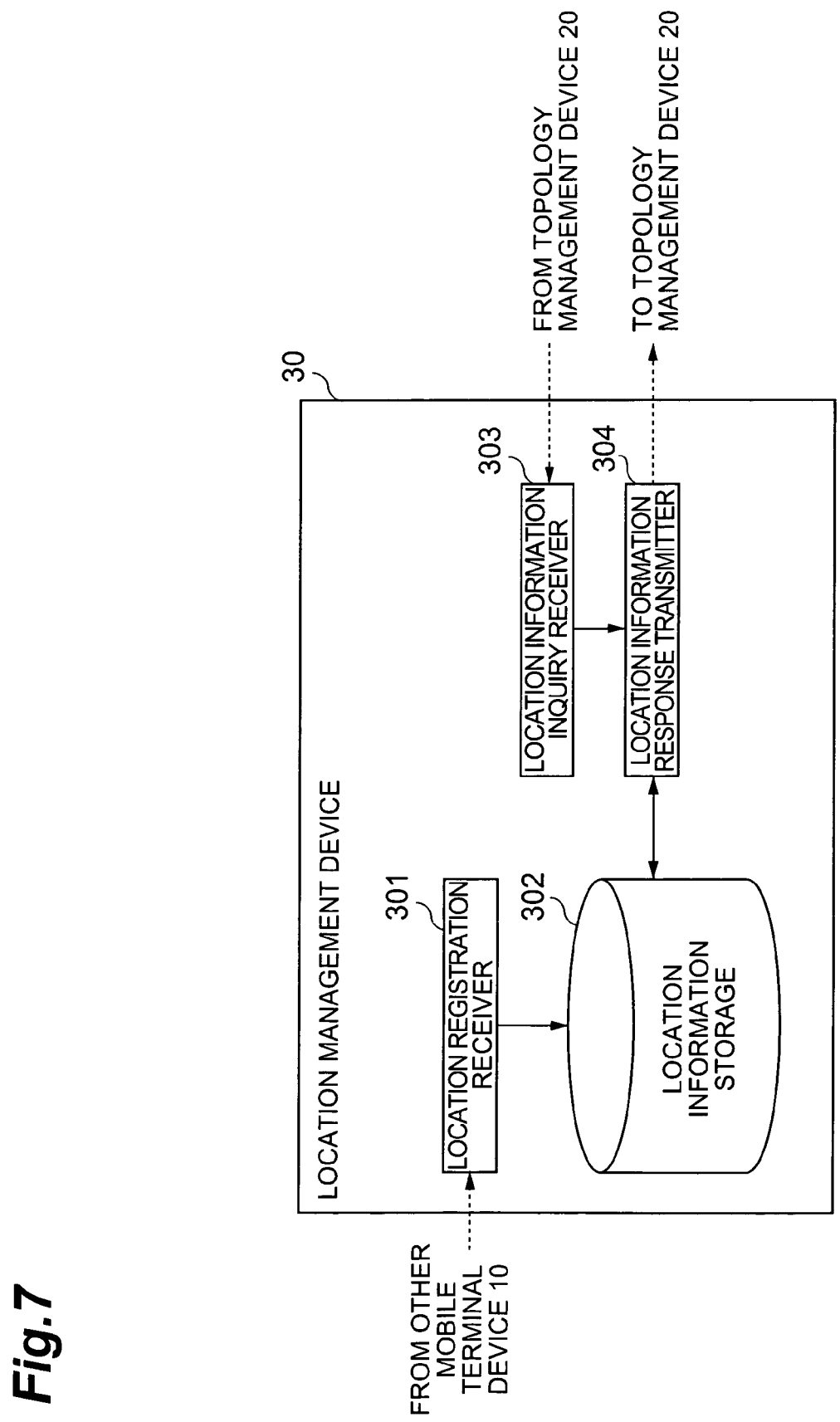
FIG. 7 is a schematic diagram to illustrate a configuration of location management device 30 in FIG. 1.

Next, the location management device 30 will be described. The location management device 30 is a device that manages to which cluster each mobile terminal device belongs. FIG. 7 is a schematic diagram to illustrate a configuration of the location management device 30. As shown in FIG. 7, the location management device 30 is comprised of location registration receiver 301 (location registration receiving means), location information storage 302 (location information storing means), location information inquiry receiver 303, and location information response transmitter 304 (location information searching means). Each of the components of this location management device 30 will be described below in detail.

The location registration receiver 301 is a part that receives the location registration information transmitted from the location registration transmitter 104 of cluster head 10a. This location registration information contains an ID of a cluster head 10a and an ID of each cluster member 10b in a cluster to which the cluster head 10a belongs. The location registration receiver 301 outputs the received location registration information to the location information storage 302.

Figure 8:
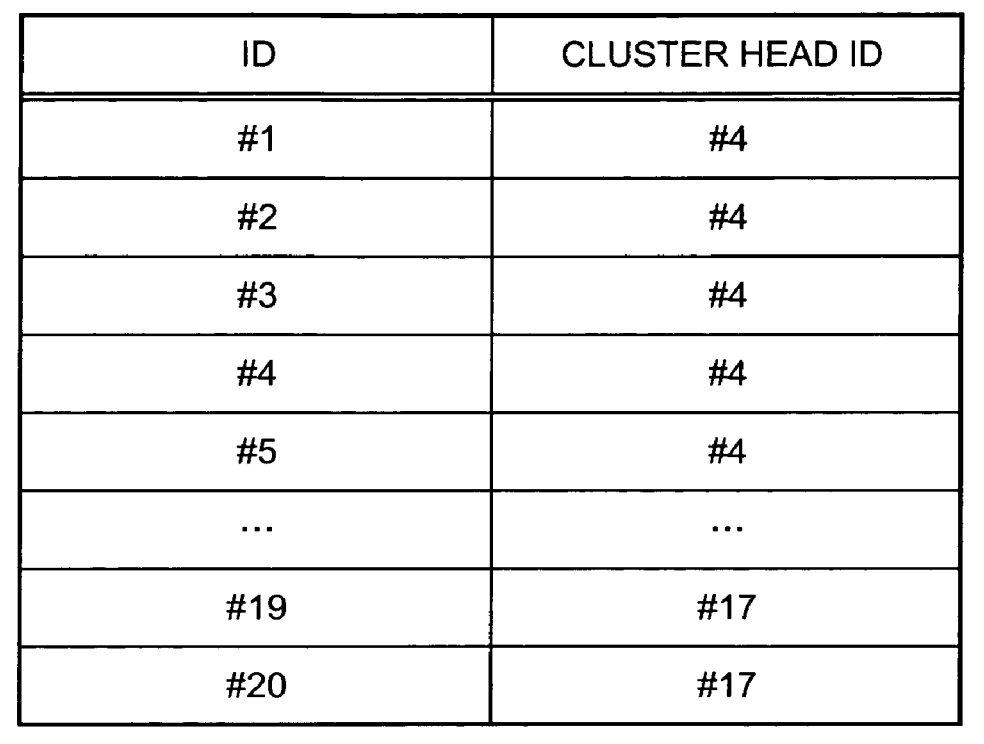

The location information storage 302 is a part that stores the location registration information fed from the location registration receiver 301. FIG. 8 shows an example of a location information table stored in the location information storage 302. In the location information table, as shown in FIG. 8, IDs of respective mobile terminal devices are recorded in the first column. IDs of cluster heads in clusters to which the mobile terminal devices of the IDs recorded in the first column belong are recorded in the second column in the location information table. Specifically, FIG. 8 is an example of the location information table recorded in the location information storage 302, in a situation where the location registration information of cluster member #1, cluster member #2, cluster member #3, cluster head #4, cluster member #5, etc. is received from the cluster head #4 and where the location registration information of cluster member #19, cluster member #20, etc. is received from the cluster head #17.

The location information inquiry receiver 303 is a part that receives a location information inquiry from the location information inquiry transmitter 204 of the topology management device 20. When the topology management device 20 sends an inquiry about location information, it sends an ID of a mobile terminal device of an object for the inquiry, as the inquiry signal about location information to the location information inquiry receiver 303. The location information inquiry receiver 303 outputs the received ID of the mobile terminal device from the topology management device 20, to the location information response transmitter 304.

The location information response transmitter 304 is a part that receives the ID of the mobile terminal device as an object for the inquiry from the location information inquiry receiver 303, that searches the location information table for an ID of a cluster head in a cluster to which the mobile terminal device belongs, and that transmits the ID of the cluster head as a response to the inquiry to the topology management device 20. Specifically, for example, in a situation where the ID of the mobile terminal device as an object for the inquiry is #20 and where the location management device 30 retains the location information table of FIG. 8, the location information response transmitter 304 searches the first column of the location information table for the entry with the ID of #20. Then the location information response transmitter 304 transmits the ID of #17 stored in the second column of the entry thus found, as a location information response to the location information response receiver 205 of the topology management device 20.

Figure 9:
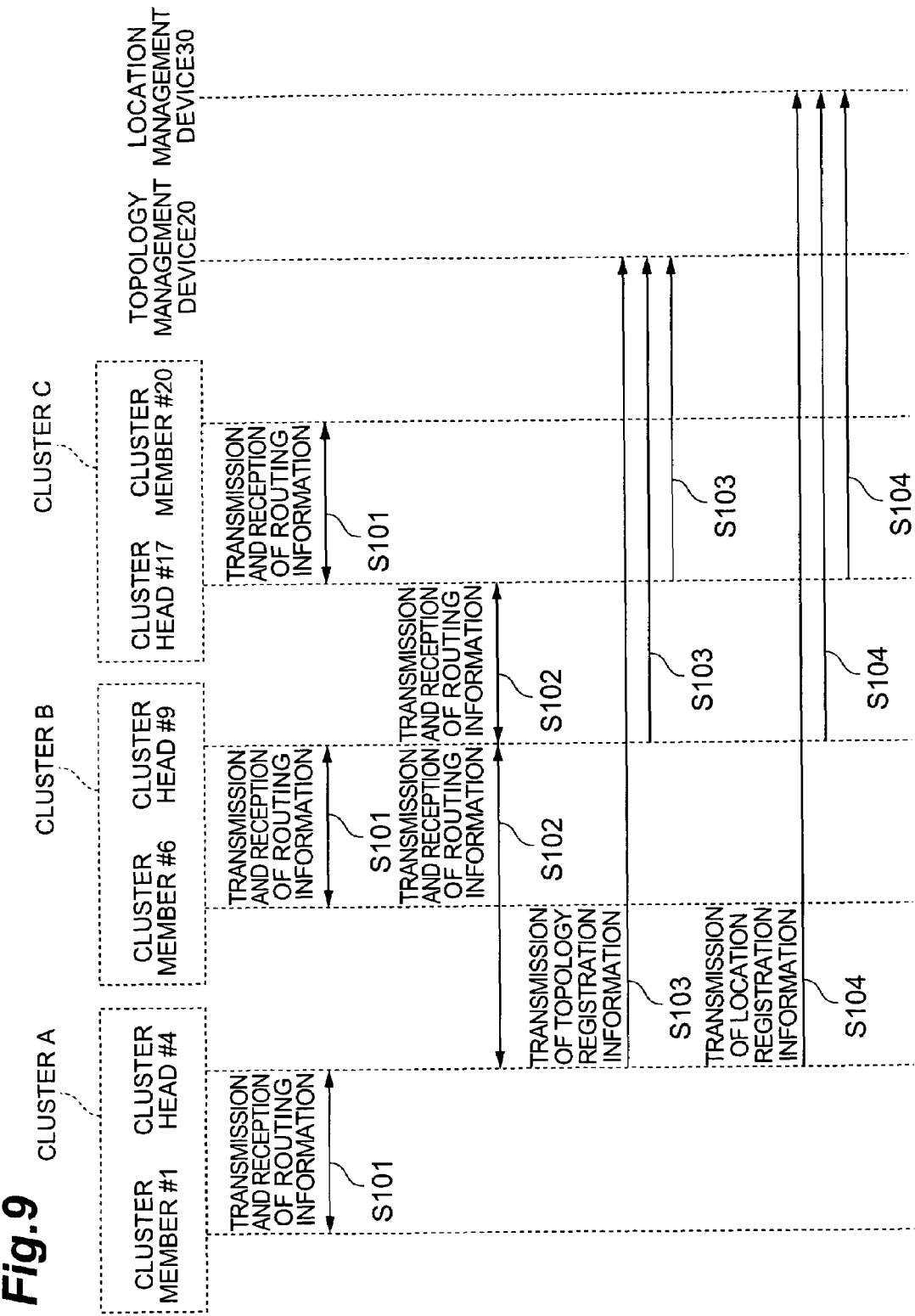
FIG. 9 is a sequence diagram for explaining an operation in mobile communication system 1 in FIG. 1.

Subsequently, the operation (communication method) carried out by the mobile terminal device 10, topology management device 20, and location management device 30 forming the mobile communication system 1 of the first embodiment as described above will be described below in detail with reference to the sequence diagrams of FIGS. 9 to 11. The operation carried out in the mobile communication system 1 is roughly classified into constant operation (cf. FIG. 9) carried out even without transmission/reception of transmitted data between mobile terminal devices 10, and operation (cf. FIGS. 10 and 11) carried out with transmission/reception of transmitted data between mobile terminal devices 10. Each of the devices will be described below in detail.

First, the constant operation carried out even without transmission/reception of transmitted data between mobile terminal devices 10 will be described with reference to FIG. 9. FIG. 9 is a sequence diagram for explaining the constant operation carried out even without transmission/reception of transmitted data between mobile terminal devices, for example, in a situation where the mobile communication system 1 includes cluster member #1 and cluster head #4 (which belong to cluster A), cluster member #6 and cluster head #9 (which belong to cluster B), cluster head #17 and cluster member #20 (which belong to cluster C), topology management device 20, and location management device 30. In FIG. 9, cluster A is adjacent to cluster B, and the cluster B is adjacent to cluster C.

First, each cluster member transmits the routing information to a cluster head in a cluster to which the host terminal belongs, and the cluster head receives the routing information thus transmitted. On the other hand, each cluster head transmits the routing information to each cluster member in a cluster to which the host terminal belongs, and the cluster member receives the routing information thus transmitted. Namely, in FIG. 9, the routing information is exchanged between cluster member #1 and cluster head #4, between cluster member #6 and cluster head #9, and between cluster head #17 and cluster member #20. Although not shown, the routing information received by each mobile terminal device is stored into the routing information storage 101 of each mobile terminal device (step S101).

Next, each cluster head transmits the routing information to a cluster head in another cluster adjacent to a cluster to which the host terminal belongs, and the cluster head of the other cluster receives the routing information thus transmitted. Namely, in FIG. 9, the routing information is exchanged between cluster head #4 and cluster head #9 and between cluster head #9 and cluster head #17. Since the cluster to which the cluster head #4 belongs is not adjacent to the cluster to which the cluster head #17 belongs, no routing information is exchanged. Although not shown, the routing information received by each cluster head is stored into the routing information storage 101 of each cluster head (step S102).

Next, each cluster head transmits an ID of the host terminal and an ID of a cluster head in another cluster adjacent to a cluster to which the host terminal belongs, as topology registration information to the topology management device 20. Namely, in FIG. 9, the cluster head #4 transmits the ID of the host terminal and the ID of the cluster head #9 to the topology management device 20, the cluster head #9 transmits the ID of the host terminal and the IDs of the cluster head #4 and cluster head #17 to the topology management device 20, and the cluster head #17 transmits the ID of the host terminal and the ID of the cluster head #9 to the topology management device 20. Although not shown, the topology registration information received by the topology management device 20 is stored into the topology information storage 202 of the topology management device 20 (step S103).

Next, each cluster head transmits an ID of the host terminal and an ID of each cluster member in a cluster to which the host terminal belongs, as location registration information to the location management device 30. Namely, in FIG. 9, the cluster head #4 transmits the ID of the host terminal and the ID of cluster member #1 to the location management device 30, the cluster head #9 transmits the ID of the host terminal and the ID of cluster member #6 to the location management device 30, and the cluster head #17 transmits the ID of the host terminal and the ID of cluster member #20 to the location management device 30. Although not shown, the location registration information received by the location management device 30 is stored into the location information storage 302 of the location management device 30 (step S104).

Subsequently, the operation carried out with transmission/reception of transmitted data between mobile terminal devices 10, particularly, an operation in a situation where a cluster head in a cluster to which a source mobile terminal device belongs retains a route to a cluster head in a cluster to which a destination mobile terminal device belongs, will be described with reference to FIG. 10.

Figure 10:
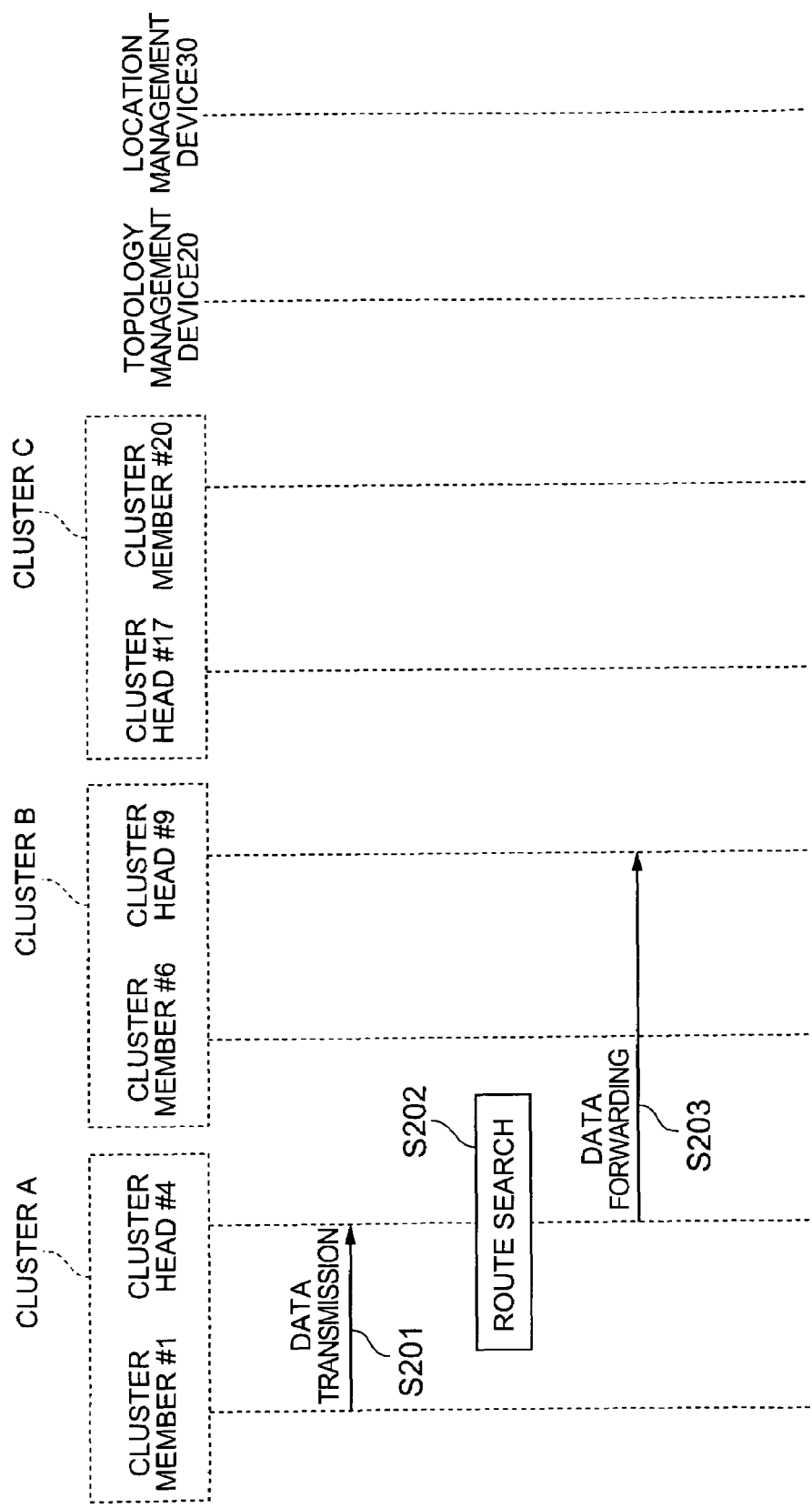
FIG. 10 is a sequence diagram for explaining an operation in mobile communication system 1 in FIG. 1.
Figure 11:
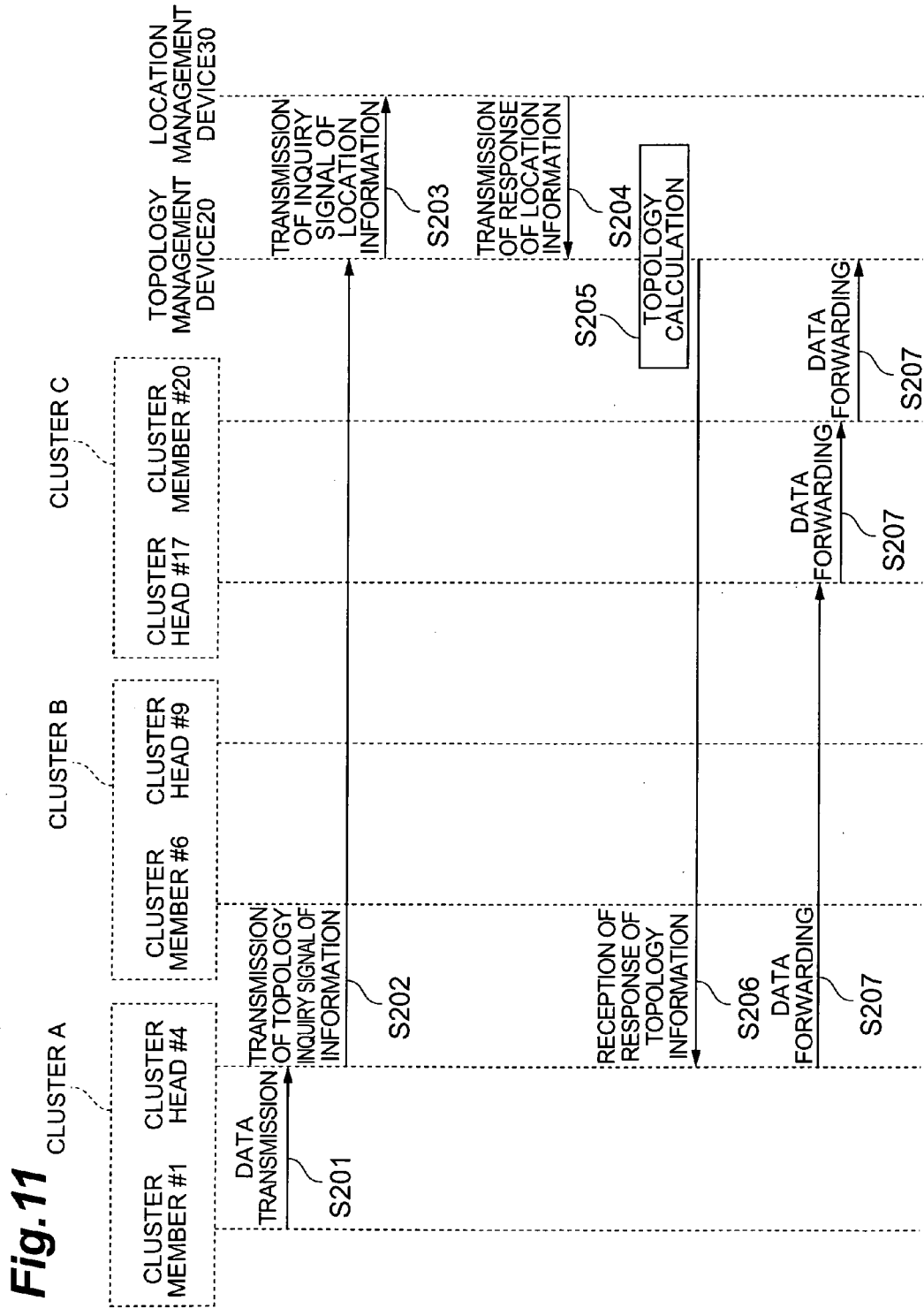
FIG. 11 is a sequence diagram for explaining an operation in mobile communication system 1 in FIG. 1.

FIG. 10 is a sequence diagram for explaining an operation carried out upon transmission of transmitted data from the cluster member #1 as a source mobile terminal device to the mobile terminal device #9 as a destination, after completion of the exchange of the routing information (step S101 and step S102), the registration of the topology information (step S103), and the registration of the location information (step S104) as described above with reference to FIG. 9.

First, the cluster member #1 transmits the ID of the destination mobile terminal device #9, and transmitted data to the cluster head #4 in the cluster to which the host terminal belongs (step S201).

The cluster head #4, receiving the ID of the destination mobile terminal device #9, and the transmitted data at step S201, searches the routing information storage 101 of the host terminal for a route to the cluster head in the cluster to which the mobile terminal device #9 belongs. The aforementioned step S102 resulted in recording the information that the cluster head in the cluster B adjacent to the cluster A to which the host terminal belongs was the mobile terminal device #9, into the routing information storage 101 of cluster head #4. This allows the cluster head #4 to find the route to the destination mobile terminal device #9 (step S202).

After finding the route to the destination mobile terminal device #9 at step S202, the cluster head #4 forwards the transmitted data received from the cluster member #1 at step S201, to the destination mobile terminal device #9 (step S203).

Subsequently, the operation carried out upon transmission and reception of transmitted data between mobile terminal devices 10, particularly, an operation in a situation where the cluster head in the cluster to which the source mobile terminal device belongs does not retain the route to the cluster head in the cluster to which the destination mobile terminal device belongs, will be described with reference to FIG. 11. FIG. 11 is a sequence diagram for explaining the operation carried out upon transmission of transmitted data from the cluster member #1 of the source mobile terminal device to the destination mobile terminal device #20, after completion of the exchange of the routing information (step S101 and step S102), the registration of the topology information (step S103), and the registration of the location information (step S104) as described above with reference to FIG. 9.

First, the cluster member #1 transmits the ID of the destination mobile terminal device #20, and transmitted data to the cluster head #4 in the cluster to which the host terminal belongs (step S201).

The cluster head #4, receiving the ID of the destination mobile terminal device #20, and the transmitted data at step S201, searches the routing information storage 101 of the host terminal for the route to the cluster head in the cluster to which the mobile terminal device #20 belongs. However, the route is not retained in the routing information storage 101 of the cluster head #4 because it was not stored at the aforementioned steps S101 and S102. For this reason, the cluster head #4 sends an inquiry signal of topology information to indicate an inquiry about information on the route, to the topology management device 20. This inquiry signal of topology information contains the ID of the cluster head #4 of the host terminal and the ID of the destination mobile terminal device #20 (step S202).

The topology management device 20, receiving the ID of the destination mobile terminal device #20 at step S202, transmits an inquiry signal of location information to indicate an inquiry about an ID of a cluster head in a cluster to which the destination mobile terminal device #20 belongs, to the location management device 30. This inquiry signal of location information contains the ID of the destination mobile terminal device #20 (step S203).

The location management device 30, receiving the ID of the destination mobile terminal device #20 at step S203, reads the ID of the cluster head in the cluster to which the mobile terminal device #20 belongs, out of the location information storage 302, and transmits the ID of the cluster head #17 as a response to the inquiry about location information to the topology management device 20. The aforementioned step S104 resulted in storing the ID of the cluster member #20 transmitted from the cluster head #17, into the location information storage 302 of the location management device 30. For this reason, the location management device 30 finds out that the cluster head in the cluster to which the mobile terminal device #20 belongs is the mobile terminal device #17 (step S204).

Next, the topology management device 20 searches the topology information storage 202, using the ID of the cluster head #4 received at step S202, as the ID of the source cluster head and using the ID of the cluster head #17 received at step S204, as the ID of the destination cluster head, to create a list of intervening cluster heads from the source cluster head #4 to the destination cluster head #17. The aforementioned step S103 resulted in storing the ID of the cluster head #9 transmitted from the cluster head #4, the IDs of the cluster head #4 and the cluster head #17 transmitted from the cluster head #9, and the ID of the cluster head #9 transmitted from the cluster head #17, into the topology information storage 202 of the topology management device 20. For this reason, the topology management device 20 finds out that the intervening cluster heads from the cluster head #4 to the cluster head #17 are cluster heads #4, #9, and #17. The list created in this manner is transmitted to the cluster head #4 (step S205).

Next, the cluster head #4 receives the above-described list transmitted from the topology management device 20 at step S205, as a response to the inquiry signal of topology information transmitted at step S202. This permits the cluster head #4 to figure out that it needs to forward the transmitted data first to the cluster head #9, in order to transmit the transmitted data received from the cluster member #1 at step S201, to the destination mobile terminal device #20 (step S206).

Next, the cluster head #4 forwards the transmitted data to the cluster head #9, the cluster head #9 forwards the transmitted data received from the cluster head #4, to the cluster head #17, and the cluster head #17 forwards the transmitted data received from the cluster head #9, to the cluster member #20. This results in properly transmitting the transmitted data from the source cluster member #1 to the destination mobile terminal device #20 (step S207).

Subsequently, the action and effect of the first embodiment will be described. The mobile terminal device 10 forming the mobile communication system 1 in the first embodiment is configured as follows: the mobile terminal device 10 serving as a cluster member 10b exchanges the routing information necessary for execution of data communication, with only the cluster head 10a in the cluster to which the host terminal belongs. Namely, the mobile terminal device 10 as a cluster member 10b retains only the routing information of the cluster head 10a in the cluster to which the host terminal belongs, and transmits the routing information of the host terminal to only the cluster head 10a. This reduces the volume of routing information exchanged between the mobile terminal devices 10 forming the mobile communication system 1, and reduces the load on each cluster member 10b.

The mobile terminal device 10 as a cluster head 10a exchanges the routing information necessary for execution of data communication, with only a cluster head in each other cluster adjacent to the cluster to which the host terminal belongs and with only each cluster member 10b in the cluster to which the host terminal belongs. Namely, the mobile terminal device 10 as a cluster head 10a retains only the routing information of the cluster head in each other cluster adjacent thereto, and only the routing information of each cluster member 10b in the cluster to which the host terminal belongs, and transmits the routing information of the host terminal to only the cluster head in each other cluster and to only each cluster member 10b in the cluster to which the host terminal belongs. This reduces the volume of routing information exchanged between the mobile terminal devices 10 forming the mobile communication system 1, and reduces the load on the mobile terminal device 10 as a cluster head 10a.

The topology registration transmitter 105 transmits the ID of the cluster head 10a as an ID of the host terminal and the ID of the cluster head in the other cluster adjacent thereto, to the topology management device 20, and the location registration transmitter 104 transmits the ID of the cluster head 10a as an ID of the host terminal and the ID of the cluster member 10b in the cluster to which the host terminal belongs, to the location management device 30. Even if the source mobile terminal device itself does not retain the route on the mobile communication system 1 to the destination mobile terminal device, it inquires of the topology management device 20 and the location management device 30 the necessary route information and receives a response thereto to acquire the route to the destination mobile terminal device, whereby it becomes feasible to properly transmit the transmitted data.

In the topology management device 20 forming the mobile communication system 1 in the first embodiment, the topology registration receiver 201 receives the ID of each cluster head and the ID of the cluster head in the other cluster adjacent to the cluster to which the cluster head belongs, i.e., the positional relation between the cluster heads in the mobile communication system 1. The topology information storage 202 stores the information received by the topology registration receiver 201. Then the topology calculator 206 calculates the route between the cluster heads in the ad hoc network with reference to the topology information storage 202 and is thus able to transmit the calculated route information, for example, to the source cluster head not retaining the route to the destination mobile terminal device.

The topology management device 20 transmits and receives information to and from only each cluster head 10a among the mobile terminal devices 10. Therefore, it reduces the volume of information transmitted and received by the topology management device 20 and reduces the load on the topology management device 20.

In the location management device 30 forming the mobile communication system 1 in the first embodiment, the location registration receiver 301 receives the ID of each cluster head and the ID of each cluster member in the cluster to which the cluster head belongs, i.e., the information indicating the positional relation between the mobile terminal devices inside an arbitrary cluster forming the mobile communication system 1. The location information storage 302 stores the information received by the location registration receiver 301. Then the location information searching part refers to the location information storage 302, for example, to search for an ID of a cluster head in a cluster to which an arbitrary destination mobile terminal device belongs, and is thus able to transmit the information to the topology management device 20.

The location management device 30 receives the information from only each cluster head 10a among the mobile terminal devices 10. Therefore, it reduces the volume of information received by the location management device 30 and reduces the load on the location management device 30.

The same action and effect as above are also achieved in the case where the first embodiment is described as a communication method in the communication network comprised of the set of mobile terminal devices 10, topology management device 20, and location management device 30.

Second Embodiment

Subsequently, the second embodiment of the present invention will be described. The second embodiment is constructed in a configuration of mobile communication system 1 similar to that in the first embodiment shown in FIG. 1, but the second embodiment is different from the first embodiment in mobile terminal device 10A forming the ad hoc network and in topology management device 20A forming the infrastructure network. Each of the components of the mobile terminal device 10A and the topology management device 20A in the second embodiment will be described below in detail with focus on the differences from the first embodiment.

Figure 12:
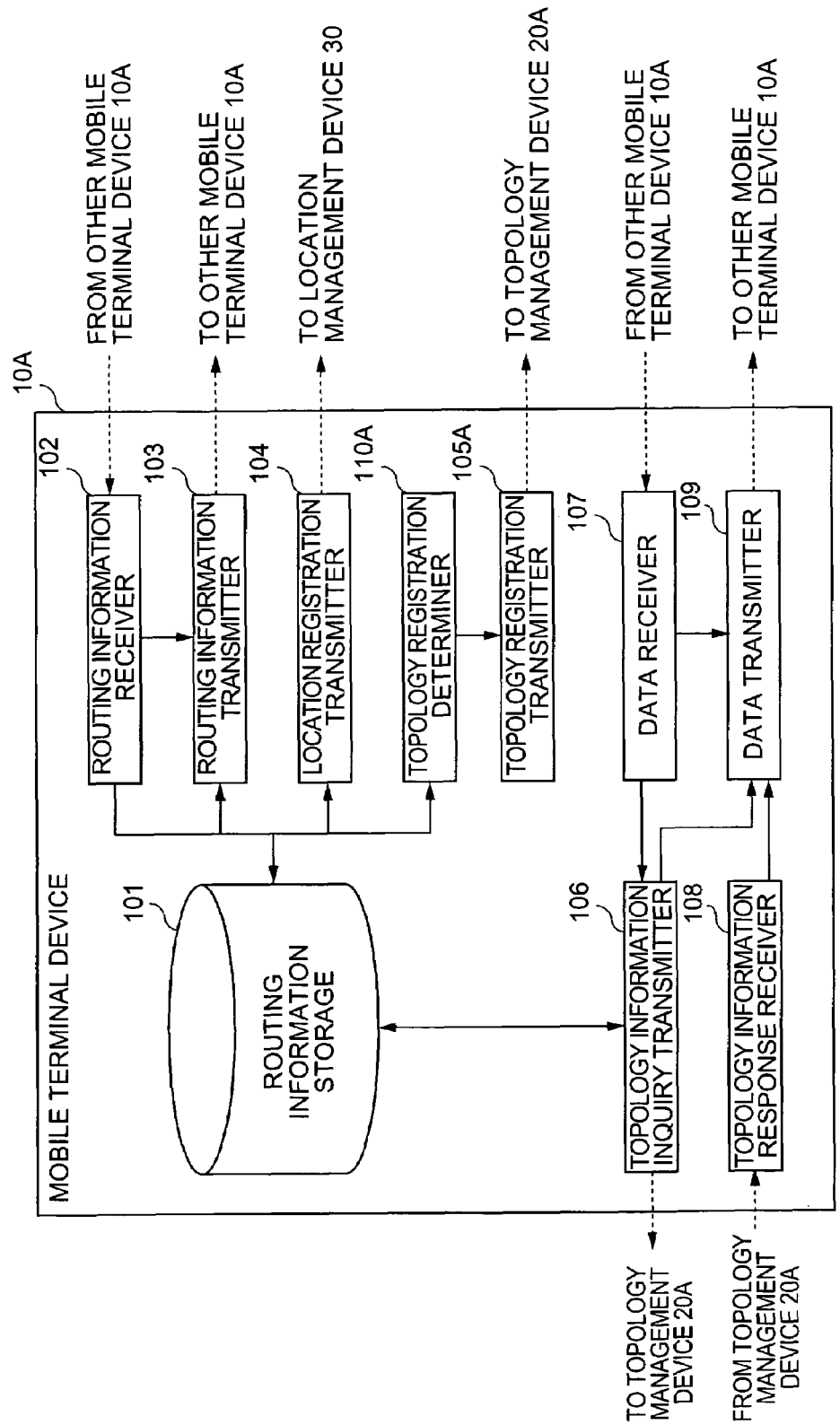
FIG. 12 is a schematic diagram to illustrate a configuration of mobile terminal device 10A in the second embodiment.

First, the mobile terminal device 10A in the second embodiment will be described with reference to FIG. 12. FIG. 12 is a schematic diagram to illustrate a configuration of the mobile terminal device 10A in the second embodiment. As shown in FIG. 12, the mobile terminal device 10A in the second embodiment further comprises topology registration determiner 110A, when compared with the mobile terminal device 10 in the first embodiment. The topology registration determiner 110A is a part that outputs to the topology registration transmitter 105A only an ID of a specific cluster head restricted by a predetermined rule, out of IDs of cluster heads in other clusters adjacent to a cluster to which the host terminal belongs, in the case where the host terminal is a cluster head 10a. The predetermined rule in the second embodiment is as follows. The topology registration determiner 110A extracts only an ID of a cluster head with the ID greater than the ID of the host terminal, out of the IDs of the cluster heads in the other clusters adjacent to the cluster to which the host terminal belongs, and outputs the extracted ID to the topology registration transmitter 105A. Besides it, the predetermined rule can be appropriately determined in view of simplicity of implementation or the like, e.g., a rule of extracting only an ID of a cluster head with the ID smaller than the ID of the host terminal, out of the IDs of the cluster heads in the other clusters adjacent to the cluster to which the host terminal belongs.

As the method of extracting an ID of a cluster head with the ID greater than the ID of the host terminal, out of the IDs of the cluster heads in the other clusters adjacent to the cluster to which the host terminal belongs, the topology registration determiner 110A first refers to the routing information storage 101 to search the routing information table for an ID of another terminal having Hflag with the value of 1. Then the topology registration determiner 110A compares the ID with the ID of the host terminal and outputs only the ID greater than the ID of the host terminal, to the topology registration transmitter 105A. Specifically, for example, in the case of FIG. 3 where the routing information table is that of the cluster head #4, the topology registration determiner 110A of the cluster head #4 outputs #9 as an ID of a cluster head having the ID greater than the ID of the host terminal, out of the IDs of the cluster heads in the other clusters adjacent to the cluster to which the host terminal belongs, to the topology registration transmitter 105A.

The topology registration transmitter 105A is a part that transmits to the topology management device 20A, the ID of the specific cluster head restricted by the predetermined rule and fed from the topology registration determiner 110A, and the ID of the host terminal extracted from the routing information storage 101, as the topology registration information. In the aforementioned case of FIG. 3, the topology registration transmitter 105A of the cluster head #4 transmits #9 fed from the topology registration determiner 110A, to the topology management device 20A and transmits #4 extracted from the routing information storage 101, as the ID of the host terminal to the topology management device 20A.

Figure 13:
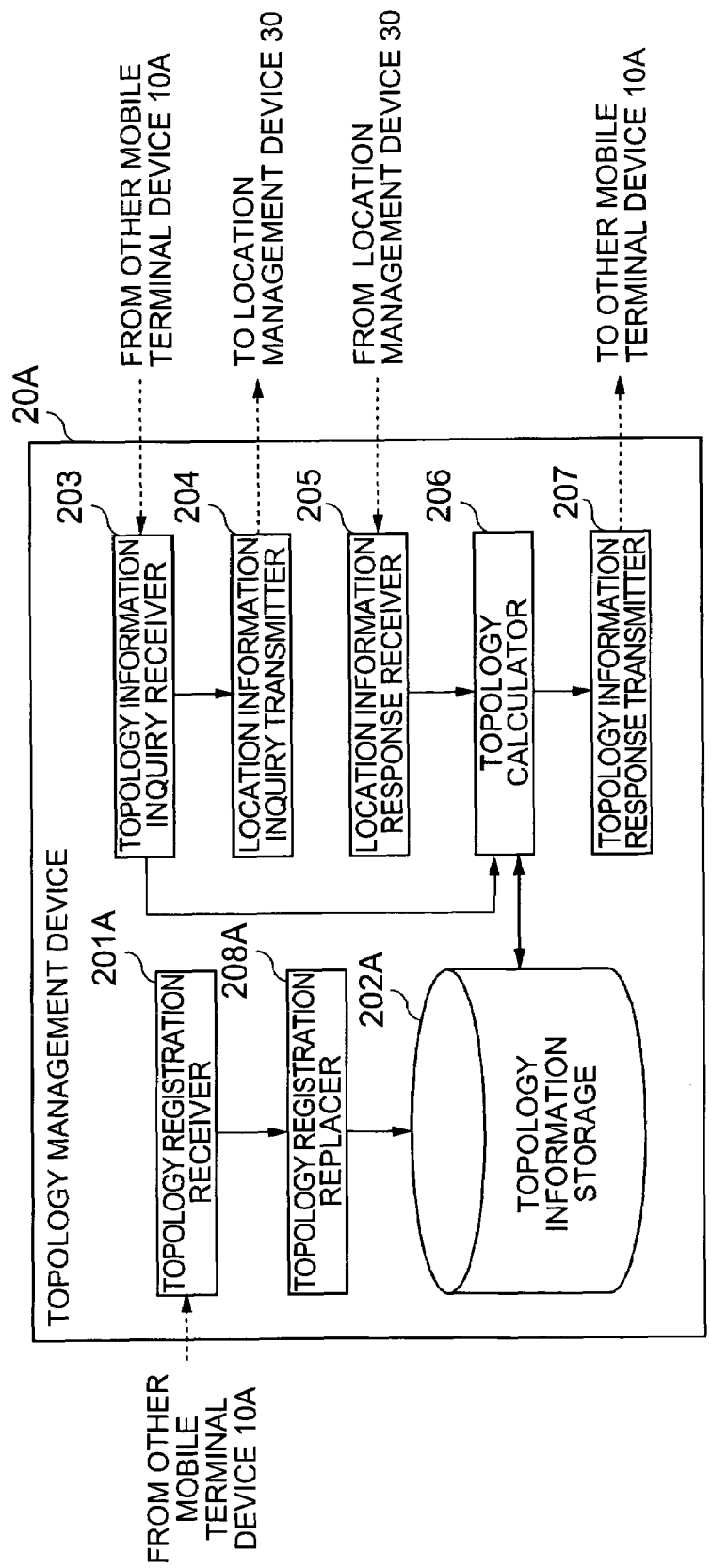
FIG. 13 is a schematic diagram to illustrate a configuration of topology management device 20A in the second embodiment.

Next, the topology management device 20A in the second embodiment will be described with reference to FIG. 13. FIG. 13 is a schematic diagram to illustrate a configuration of the topology management device 20A in the second embodiment. As shown in FIG. 13, the topology management device 20A in the second embodiment further comprises topology registration replacer 208A, when compared with the topology management device 20A in the first embodiment, and the topology registration receiver 201A outputs the topology registration information received from each cluster head, to the topology registration replacer 208A. This topology registration information contains an ID of a host terminal as a source cluster head and an ID of a cluster head in another cluster adjacent to a cluster to which the cluster head belongs.

The topology registration replacer 208A is a part that creates second topology registration information from the topology registration information fed from the topology registration receiver 201A (which will be referred to hereinafter as "first topology registration information"). Specifically, the topology registration replacer 208A replaces an ID of a source cluster head in the first topology registration information, with an ID of a cluster head in another cluster adjacent to the cluster to which the source cluster head belongs, and replaces the ID of the cluster head in the other cluster adjacent to the cluster to which the source cluster head belongs, with the ID of the source cluster head in the first topology registration information, thereby creating the second topology registration information. Namely, for example, in a situation where the input is the first topology registration information to indicate that the ID of the cluster head in the other cluster adjacent to the cluster to which the cluster head #4 belongs is #9, the topology registration replacer 208A creates the second topology registration information to indicate that the ID of the cluster head in the other cluster adjacent to the cluster to which the cluster head #9 belongs is #4. Then the topology registration replacer 208A outputs the first topology registration information and the second topology registration information thus created, to the topology information storage 202A.

Figure 14:
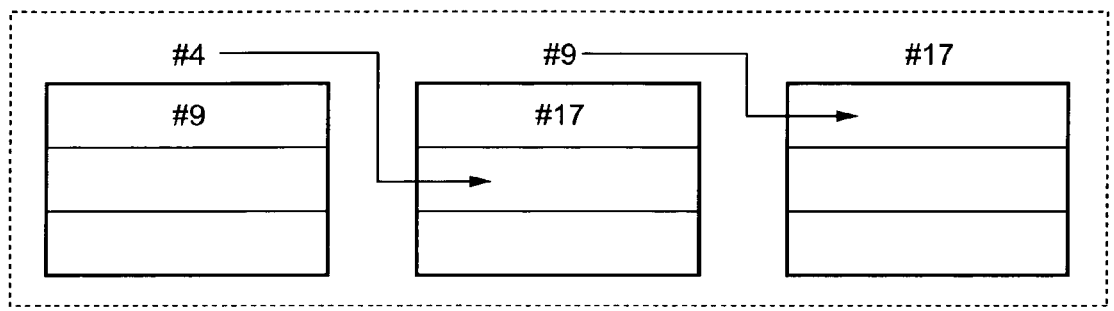
FIG. 14 is an example of topology registration information stored in topology management device 20A in FIG. 13.

The topology information storage 202A is a part that stores the first topology registration information and the second topology registration information fed from the topology registration replacer 208A. FIG. 14 shows an example of the first topology registration information and second topology registration information stored in the topology information storage 202A. FIG. 14 shows that, without need for performing reception of four topology registration information items by the topology registration receiver 201 as in the case of the first embodiment shown in FIG. 6, the four topology registration information items as in the case of FIG. 6 are stored through reception of only two topology registration information items from the topology registration receiver 201A. Namely, the first topology registration information from the cluster head #4 is stored as a topology information table of the cluster head #4 as it is, and the second topology registration information created from the first topology registration information is stored as a topology information table (second row) of the cluster head #9. In addition, the first topology registration information from the cluster head #9 is stored as a topology information table (first row) of the cluster head #9 as it is, and the second topology registration information created from the first topology registration information is stored as a topology information table of the cluster head #17.

Figure 15:
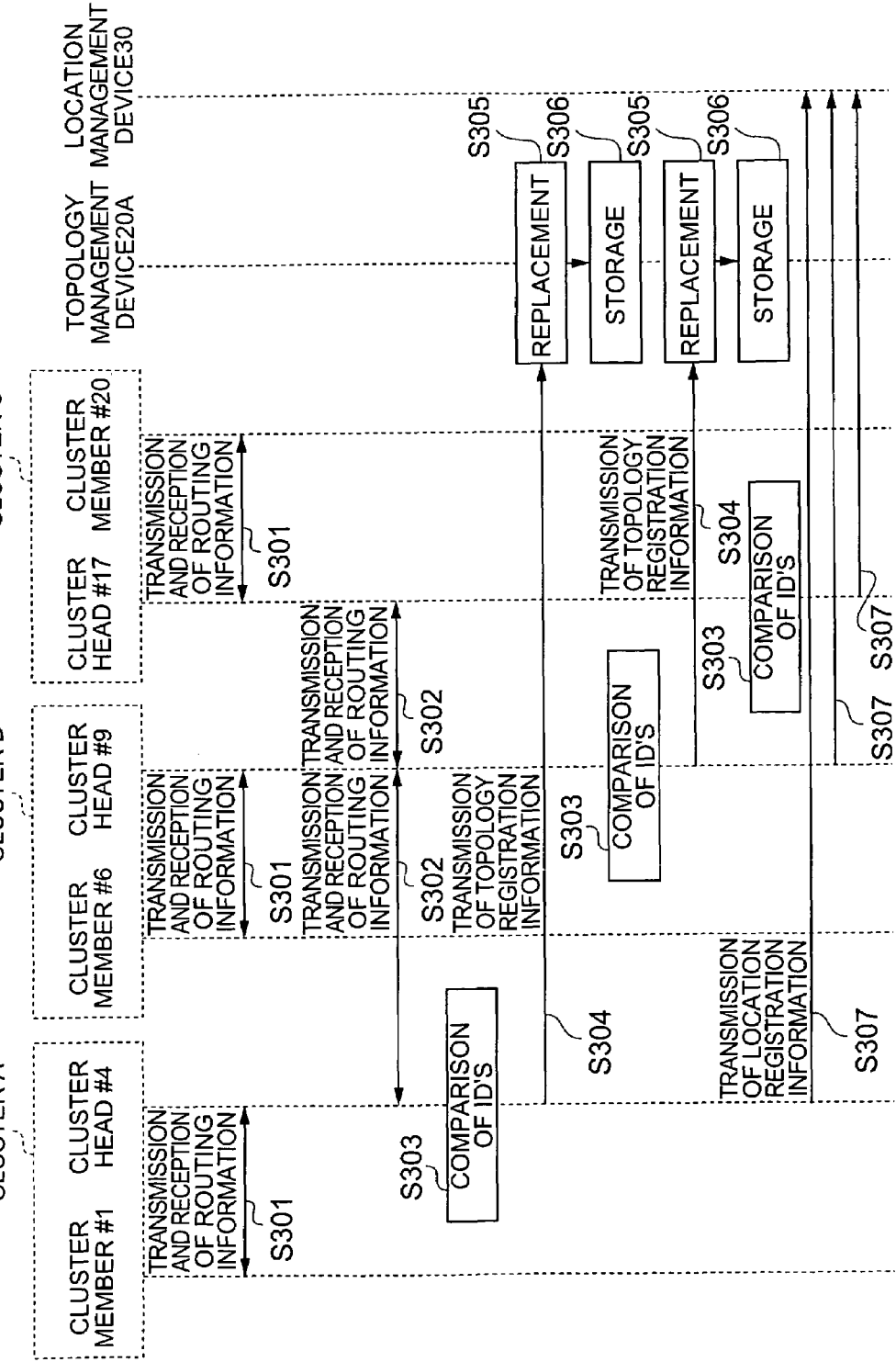
FIG. 15 is a sequence diagram for explaining an operation in mobile communication system 1 in the second embodiment.

Subsequently, the operation carried out by the mobile terminal device 10A, topology management device 20A, and location management device 30 forming the mobile communication system 1 of the second embodiment as described above will be described in detail with reference to the sequence diagram of FIG. 15. FIG. 15 is the sequence diagram for explaining the constant operation carried out even without transmission/reception of transmitted data between mobile terminal devices, for example, in a situation where the mobile communication system 1 is constructed including cluster member #1 and cluster head #4 (which belong to cluster A), cluster member #6 and cluster head #9 (which belong to cluster B), cluster head #17 and cluster member #20 (which belong to cluster C), topology management device 20A, and location management device 30. In FIG. 15, cluster A is adjacent to cluster B, and cluster B is adjacent to cluster C.

First, each cluster member transmits its routing information to a cluster head in a cluster to which the host terminal belongs, and the cluster head receives the routing information thus transmitted. On the other hand, each cluster head transmits its routing information to each cluster member in a cluster to which the host terminal belongs, and the cluster member receives the routing information thus transmitted. Namely, in FIG. 15, the routing information is exchanged between cluster member #1 and cluster head #4, between cluster member #6 and cluster head #9, and between cluster head #17 and cluster member #20. Although not shown, the routing information received by each mobile terminal device is stored into the routing information storage 101 of each mobile terminal device (step S301).

Next, each cluster head transmits its routing information to a cluster head in another cluster adjacent to a cluster to which the host terminal belongs, and the cluster head in the other cluster receives the routing information thus transmitted. Namely, in FIG. 15, the routing information is exchanged between cluster head #4 and cluster head #9 and between cluster head #9 and cluster head #17. Since the cluster to which the cluster head #4 belongs is not adjacent to the cluster to which the cluster head #17 belongs, no routing information is exchanged between them. Although not shown, the routing information received by each cluster head is stored into the routing information storage 101 of each cluster head (step S302).

Then the topology registration determiner 110A of each cluster head first refers to the routing information storage 101 to search the routing information table for an ID of another terminal having Hflag with the value of 1. Then the topology registration determiner 110A compares the ID of the other terminal with the ID of the host terminal to extract only an ID greater than the ID of the host terminal, and outputs the extracted ID to the topology registration transmitter 105A. Namely, the topology registration determiner 110A of cluster head #4 outputs #9 to the topology registration transmitter 105A. Furthermore, the topology registration determiner 110A of cluster head #9 outputs to the topology registration transmitter 105A, #17 as an ID of a cluster head having the ID greater than the ID of the host terminal, out of the IDs of the cluster heads in the other clusters adjacent to the cluster to which the host terminal belongs. In addition, the topology registration determiner 110A of cluster head #17 outputs nothing to the topology registration transmitter 105A because the cluster head #9 is not a cluster having an ID greater than the ID of the host terminal (step S303).

Next, the topology registration transmitter 105A of each cluster head transmits the ID fed from the topology registration determiner 110A at step S303 and the ID of the host terminal extracted from the routing information storage 101, as the first topology registration information to the topology management device 20A. Namely, the topology registration transmitter 105A of cluster head #4 transmits #4 and #9 to the topology management device 20A, and the topology registration transmitter 105A of cluster head #9 transmits #9 and #17 to the topology management device 20A (step S304).

Next, the topology registration replacer 208A of the topology management device 20A creates the second topology registration information from the first topology registration information fed from the topology registration transmitter 105A of each cluster head. Namely, for example, in a situation where the topology registration replacer 208A receives as input from the cluster head #4, the first topology registration information indicating that the ID of the cluster head in the other cluster adjacent to the cluster to which the cluster head #4 belongs is #9, it creates the second topology registration information indicating that the ID of the cluster head in the other cluster adjacent to the cluster to which the cluster head #9 belongs is #4. In another situation where the topology registration replacer 208A receives as input from the cluster head #9 the first topology registration information indicating that the ID of the cluster head in the other cluster adjacent to the cluster to which the cluster head #9 belongs is #17, it creates the second topology registration information indicating that the ID of the cluster head in the other cluster adjacent to the cluster to which the cluster head #17 belongs is #9. The topology registration replacer 208A outputs to the topology information storage 202A, the second topology registration information created in this manner and the first topology registration information transmitted at step S304 (step S305).

Next, the first topology registration information and the second topology registration information outputted at step S305 is stored into the topology registration storage of the topology management device 20A. As shown in FIG. 14, the first topology registration information from the cluster head #4 is stored as the topology information table of cluster head #4 as it is, and the second topology registration information created from the first topology registration information at step S305 is stored as the topology information table (second row) of the cluster head #9. The first topology registration information from the cluster head #9 is stored as the topology information table (first row) of the cluster head #9 as it is, and the second topology registration information created from the first topology registration information at step S305 is stored as the topology information table of the cluster head #17 (step S306).

Next, each cluster head transmits an ID of the host terminal and an ID of each cluster member in a cluster to which the host terminal belongs, as the location registration information to the location management device 30. Namely, in FIG. 15, the cluster head #4 transmits the ID of the host terminal and the ID of cluster member #1 to the location management device 30, the cluster head #9 transmits the ID of the host terminal and the ID of cluster member #6 to the location management device 30, and the cluster head #17 transmits the ID of the host terminal and the ID of cluster member #20 to the location management device 30. Although not shown, the location registration information received by the location management device 30 is stored into the location information storage 302 of the location management device 30 (step S307).

Subsequently, the action and effect of the second embodiment will be described. In the mobile terminal device 10A in the second embodiment, the topology registration transmitter 105A transmits to the topology management device 20A only the ID of the cluster head having the ID greater than the ID of the host terminal, out of the IDs of the cluster heads in the other clusters adjacent to the cluster to which the host terminal belongs. Therefore, it reduces the volume of information transmitted from the mobile terminal device 10A to the topology management device 20A and reduces the load on the mobile terminal device 10A.

In the topology management device 20A in the second embodiment, the topology registration receiver 201A receives from the source cluster head only the ID of the cluster head in the other cluster having the ID greater than the ID of the source cluster head, out of the IDs of the cluster heads in the other clusters adjacent to the cluster to which the source cluster head belongs. Therefore, it reduces the volume of information transmitted from the source cluster head and received by the topology management device 20A and reduces the load on the topology management device 20A.

The disclosure of Japanese Patent Application No. 2005-252082 filed Aug. 31, 2005 including specification, drawings and claims is incorporated herein by reference in its entirety.

What is claimed is:

1. A mobile terminal device in a communication network comprised of a set of mobile terminal devices, a topology management device, and a location management device, said mobile terminal device comprising:

routing information receiving means for receiving representative terminal identification information to identify a location on the communication network of a representative mobile terminal device as a representative of the set to which the mobile terminal device itself belongs, as a host mobile terminal device, from the representative mobile terminal device;

routing information storing means for storing the representative terminal identification information received by the routing information receiving means, and host terminal identification information to identify a location on the communication network of the host mobile terminal device;

routing information transmitting means for reading the representative terminal identification information and the host terminal identification information out of the routing information storing means and for transmitting said host terminal identification information to said representative mobile terminal device on the basis of the representative terminal identification information;

data transmitting means for reading the representative terminal identification information out of the routing information storing means and for transmitting transmitted data to the representative mobile terminal device on the basis of the representative terminal identification information;

topology registration transmitting means for reading the host terminal identification information as the representative terminal identification information, and other representative terminal identification information to identify a location on the communication network of an other representative mobile terminal device as a representative of an other set adjacent to the set to which the host mobile terminal device belongs, out of the routing information storing means and for transmitting the host terminal identification information and the other representative terminal identification information to the topology management device;

location registration transmitting means for reading the host terminal identification information is the representative terminal identification information, and nonrepresentative terminal identification information to identify a location on the communication network of a nonrepresentative mobile terminal device not representing the set to which the host mobile terminal device belongs, out of the routing information storing means and for transmitting the host terminal identification information and the nonrepresentative terminal identification information to the location management device; and topology information receiving means for receiving from the topology management device, topology information to indicate a route on the communication network from a source representative mobile terminal device as a representative of a set to which a source mobile terminal device as a source of transmitted data belongs, to a destination representative mobile terminal device as a representative of a set to which a destination mobile terminal device as a destination of the transmitted data belongs, wherein the routing information receiving means receives the other representative terminal identification information from the other representative mobile terminal device and receives the nonrepresentative terminal identification information from the nonrepresentative mobile terminal device, the routing information storing means stores the other representative terminal identification information and the nonrepresentative terminal identification information received by the routing information receiving means, the routing information transmitting means transmits the host terminal identification information as the representative terminal identification information to the nonrepresentative mobile terminal device and to the other representative mobile terminal device, and the data transmitting means transmits the transmitted data to the destination representative mobile terminal device on the basis of the topology information received by the topology information receiving means, transmits the transmitted data to the other representative mobile terminal device on the basis of the other representative terminal identification information stored in the routing information storing means, and transmits the transmitted data to the nonrepresentative mobile terminal device on the basis of the nonrepresentative terminal identification information stored in the routing information storing means.

2. The mobile terminal device according to claim 1, wherein the topology registration transmitting means transmits the host terminal identification information as the representative terminal identification information, and specific other representative terminal identification information to the topology management device.

3. A topology management device in a communication network comprised of a set of mobile terminal devices, the topology management device, and a location management device, said topology management device comprising:
    topology registration receiving means for receiving representative terminal identification information to identify a location on the communication network of a representative mobile terminal device as a representative of the set, and other representative terminal identification information to identify a location on the communication network of an other representative mobile terminal device as a representative of an other set adjacent to said set on the communication network, from the representative mobile terminal device;
    topology information storing means for storing the representative terminal identification information and the other representative terminal identification information received by the topology registration receiving means;
    location information receiving means for receiving source representative terminal identification information to identify a location on the communication network of a source representative mobile terminal device as a representative of a set to which a source mobile terminal device as a source of transmitted data belongs, and destination terminal identification information to identify a location on the communication network of a destination mobile terminal device as a destination of the transmitted data, from said source representative mobile terminal device and for receiving destination representative terminal identification information to identify a location on the communication network of a destination representative mobile terminal device as a representative of a set to which the destination mobile terminal device belongs, from the location management device; and
    topology calculating means for calculating topology information to indicate a route on the communication network from the source representative mobile terminal device to the destination representative mobile terminal device, based on the source representative terminal identification information and the destination representative terminal identification information received by the location information receiving means, with reference to the representative terminal identification information and the other representative terminal identification information stored in the topology information storing means, and for transmitting the calculated topology information to the source representative mobile terminal device.

4. The topology management device according to claim 3, where in the topology registration receiving means receives the representative terminal identification information, and specific other representative terminal identification information from the representative mobile terminal device, and
wherein the topology information storing means stores the representative terminal identification information received by the topology registration receiving means, as the specific other representative terminal identification information and stores the specific other representative terminal identification information received by the topology registration receiving means, as the representative terminal identification information.

5. A communication method in a communication network which is comprised of a set of mobile terminal devices, a topology management device, and a location management device, said communication method comprising:
    a routing information receiving step wherein routing information receiving means of a first mobile terminal device receives representative terminal identification information to identify a location on the communication network of a representative mobile terminal device as a representative of the set to which the first mobile terminal device itself belongs, as a host terminal device, from the representative mobile terminal device, receives other representative terminal identification information to identify a location on the communication network of an other representative mobile terminal device as a representative of an other set adjacent to the set to which the host mobile terminal device belongs, on the communication network, from the other representative mobile terminal device, and receives nonrepresentative terminal identification information to identify a location on the communication network of a nonrepresentative mobile terminal device not representing the set to which the host mobile terminal device belongs, from the nonrepresentative mobile terminal device;
    a routing information storing step wherein routing information storing means of the first mobile terminal device stores host terminal identification information to identify a location on the communication network of the host mobile terminal device, and stores the representative terminal identification information, the other representative terminal identification information, and the non-representative terminal identification information received in the routing information receiving step;
    a routing information transmitting step wherein routing information transmitting means of the first mobile terminal device transmits the host terminal identification information as the nonrepresentative terminal identification information to the representative mobile terminal device and transmits the host terminal identification information as the representative terminal identification information to the nonrepresentative mobile terminal device and to the other representative mobile terminal device;
    a topology registration transmitting step wherein topology registration transmitting means of the first mobile terminal device transmits the host terminal identification information as the representative terminal identification information, and the other representative terminal identification information to the topology management device;
    a topology registration receiving step wherein topology registration receiving means of the topology management device receives the representative terminal identification information and the other representative terminal identification information transmitted in the topology registration transmitting step;

a topology information storing step wherein topology information storing means of the topology management device stores the representative terminal identification information and the other representative terminal identification information received in the topology registration receiving step;

a location registration transmitting step wherein location registration transmitting means of the first mobile terminal device transmits the host terminal identification information as the representative terminal identification information, and the nonrepresentative terminal identification information to the location management device;

a location registration receiving step wherein location registration receiving means of the location management device receives the representative terminal identification information and the nonrepresentative terminal identification information transmitted in the location registration transmitting step;

a location information storing step wherein location information storing means of the location management device stores the representative terminal identification information and the nonrepresentative terminal identification information received in the location registration receiving step;

a location information searching step wherein location information searching means of the location management device reads representative terminal identification information in a set to which an arbitrary nonrepresentative mobile terminal device belongs, from the representative terminal identification information stored in the location information storing step, and transmits the read representative terminal identification information to the topology management device;

a location information receiving step wherein location information receiving means of the topology management device receives source representative terminal identification information to identify a location on the communication network of a source representative mobile terminal device as a representative of a set to which a source mobile terminal device as a source of transmitted data belongs, and destination terminal identification information to identify a location on the communication network of a destination mobile terminal device as a destination of the transmitted data, from the source representative mobile terminal device, and receives destination representative terminal identification information to identify a location on the communication network of a destination representative mobile terminal device as a representative of a set to which the destination mobile terminal device belongs, from the location management device through the location information searching step;

a topology calculating step wherein topology calculating means of the topology management device calculates topology information to indicate a route on the communication network from the source representative mobile terminal device to the destination representative mobile terminal device, based on the source representative terminal identification information and the destination representative terminal identification information received in the location information receiving step, with reference to the representative terminal identification information and the other representative terminal identification information stored in the topology information storing step, and transmits the calculated topology information to the source representative mobile terminal device;

a topology information receiving step wherein topology information receiving means of the first mobile terminal device receives the topology information calculated in the topology calculating step, from the topology management device; and a data transmitting step wherein data transmitting means of the first mobile terminal device transmits the transmitted data to the destination representative mobile terminal device on the basis of the topology information received in the topology information receiving step, transmits the transmitted data to the other representative mobile terminal device on the basis of the other representative terminal identification information received in the routing information receiving step, transmits the transmitted data to the nonrepresentative mobile terminal device on the basis of the nonrepresentative terminal identification information received in the routing information receiving step, and transmits the transmitted data to the representative mobile terminal device on the basis of the representative terminal identification information received in the routing information receiving step.

6. The communication method according to claim 5, wherein in the topology registration transmitting step the topology registration transmitting means of the first mobile terminal device transmits the host terminal identification information as the representative terminal identification information, and specific other representative terminal identification information to the topology management device, wherein in the topology registration receiving step the topology registration receiving means of the topology management device receives the representative terminal identification information and the specific other representative terminal identification information transmitted in the topology registration transmitting step, and wherein in the topology information storing step the topology information storing means of the topology management device stores the representative terminal identification information received in the topology registration receiving step, as the specific other representative terminal identification information and stores the specific other representative terminal identification information received in the topology registration receiving step, as the representative terminal identification information.

7. A communication network comprising a set of mobile terminal devices, a topology management device, and a location management device, each of the mobile terminal devices comprising routing information receiving means for receiving representative terminal identification information to identify a location on the communication network of a representative mobile terminal device as a representative of the set to which the mobile terminal device itself belongs as a host mobile terminal device, from the representative mobile terminal device, routing information storing means for storing the representative terminal identification information received by the routing information receiving means and host terminal identification information to identify a location on the communication network of the host mobile terminal device, routing information transmitting means for reading the representative terminal identification information and the host terminal identification information out of the routing information storing means and for transmitting said host terminal identification information to said representative mobile terminal device on the basis of the representative terminal identification information, data transmitting means for reading the representative terminal identification information out of the routing information storing means and for transmitting transmitted data to the representative mobile terminal device on the basis of the representative terminal identification information;

topology registration transmitting means for reading the host terminal identification information, as the representative terminal identification information, and other representative terminal identification information to identify a location on the communication network of an other representative mobile terminal devise as a representative of another set adjacent to the set of mobile terminal devices to which the host mobile terminal device belongs, out of the routing information storing means, and for transmitting the host terminal identification information and the other representative terminal identification information to the topology management device, location registration transmitting means for reading the host terminal identification information, as the representative terminal identification information, and nonrepresentative terminal identification information to identify a location on the communication network of a nonrepresentative mobile terminal device not representing the set to which the host mobile terminal device belongs, out of the routing information storing means, and for transmitting the host terminal identification information and the nonrepresentative terminal identification information to the location management device, and topology information receiving means for receiving, from the topology management device, topology information to indicate a route on the communication network from a source representative mobile terminal device, as a representative of a set of mobile terminal devices to which a source mobile terminal device as a source of transmitted data belongs, to a destination representative mobile terminal device as a representative of a set to which a destination mobile terminal device as a destination of the transmitted data belongs, wherein the routing information receiving means receives the other representative terminal identification information from the other representative mobile terminal device and receives the nonrepresentative terminal identification information from the nonrepresentative mobile terminal device, the routing information storing means stores the other representative terminal identification information and the nonrepresentative terminal identification information received by the routing information receiving means, the routing information transmitting means transmits the host terminal identification information as the representative terminal identification information to the nonrepresentative mobile terminal device and to the other representative mobile terminal device, and the data transmitting means transmits the transmitted data to the destination representative mobile terminal device on the basis of the topology information received by the topology information receiving means, transmits the transmitted data to the other representative mobile terminal device on the basis of the other representative terminal identification information stored in the routing information storing means, and transmits the transmitted data to the nonrepresentative mobile terminal device on the basis of the nonrepresentative terminal identification information stored in the routing information storing means;

said topology management device comprising topology registration receiving means for receiving representative terminal identification information to identify a location on the communication network of a representative mobile terminal device, as a representative of the set, and other representative terminal identification information to identify a location on the communication network of an other representative mobile terminal device as a representative of an other set of mobile terminal devices adjacent to said set of mobile terminal devices on the communication network, from the representative mobile terminal device, topology information storing means for storing the representative terminal identification information and the other representative terminal identification information received by the topology registration receiving means, location information receiving means for receiving source representative terminal identification information to identify a location on the communication network of a source representative mobile terminal device, as a representative of a set of mobile terminal devices to which a source mobile terminal device as a source of transmitted data belongs, and destination terminal identification information to identify a location on the communication network of a destination mobile terminal device, as a destination of the transmitted data, from said source representative mobile terminal device and for receiving destination representative terminal identification information to identify a location on the communication network of a destination representative mobile terminal device, as a representative of a set of mobile terminal devices to which the destination mobile terminal device belongs, from the location management device, and topology calculating means for calculating topology information to indicate a route on the communication network from the source representative mobile terminal device to the destination representative mobile terminal device, based on the source representative terminal identification information and the destination representative terminal identification information received by the location information receiving means, with reference to the representative terminal identification information and the other representative terminal identification information stored in the topology information storing means, and for transmitting the calculated topology information to the source representative mobile terminal device; and said location management device comprising location registration receiving means for receiving representative terminal identification information to identify a location on the communication network of a representative mobile terminal device, as a representative of the set of mobile terminal devices, and nonrepresentative terminal identification information to identify a location on the communication network of a nonrepresentative mobile terminal device not representing the set of mobile terminal devices, from the representative mobile terminal device, location information storing means for storing the representative terminal identification information and the nonrepresentative terminal identification information received by the location registration receiving means, and location information searching means for reading representative terminal identification information in a set to which an arbitrary nonrepresentative mobile terminal device belongs, out of the location information storing means, and for transmitting the read representative terminal identification information to the topology management device.

* * * * *